United States Patent
Eijkelenberg et al.

(10) Patent No.: US 7,628,167 B2
(45) Date of Patent: Dec. 8, 2009

(54) SPRING STEEL HIGH OVERPRESSURE VENT STRUCTURE

(75) Inventors: Tom Eijkelenberg, Westerlo (BE); Guy Jakus, Zemst (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 203 days.

(21) Appl. No.: 11/466,958

(22) Filed: Aug. 24, 2006

(65) Prior Publication Data

US 2008/0041454 A1    Feb. 21, 2008

Related U.S. Application Data

(63) Continuation-in-part of application No. 11/465,257, filed on Aug. 17, 2006, now abandoned.

(51) Int. Cl.
*F16K 17/16* (2006.01)
*E04B 1/00* (2006.01)

(52) U.S. Cl. ............ 137/68.23; 137/68.27; 137/910; 52/1; 52/98

(58) Field of Classification Search ............ 137/68.21, 137/68.23, 68.24, 68.25, 68.26, 68.27, 68.28, 137/521.1, 857, 910; 52/1, 98, 99, 100; 220/89.2
See application file for complete search history.

(56) References Cited

U.S. PATENT DOCUMENTS

| | | | | |
|---|---|---|---|---|
| 1,679,012 A | * | 7/1928 | Wilson | 137/856 |
| 1,682,908 A | * | 9/1928 | Osgood | 137/512.5 |
| 2,169,123 A | * | 8/1939 | Galusha | 220/89.2 |
| 4,498,261 A | | 2/1985 | Wilson et al. | |
| 4,612,739 A | | 9/1986 | Wilson | |
| 4,777,974 A | * | 10/1988 | Swift et al. | 137/68.25 |
| 4,821,909 A | * | 4/1989 | Hibler et al. | 220/203.08 |
| 5,036,632 A | | 8/1991 | Short, III et al. | |
| 5,213,125 A | * | 5/1993 | Leu | 137/856 |
| 5,305,775 A | * | 4/1994 | Farwell | 220/89.2 |
| 5,695,214 A | * | 12/1997 | Faigle et al. | 137/68.13 |
| 6,070,365 A | * | 6/2000 | Leonard | 52/1 |
| 6,607,003 B1 | * | 8/2003 | Wilson | 220/89.2 |
| 6,959,828 B2 | * | 11/2005 | Eijkelenberg et al. | 220/89.2 |
| 2005/0028863 A1 | * | 2/2005 | May | 137/68.19 |
| 2007/0163648 A1 | * | 7/2007 | Eijkelenberg et al. | 137/71 |

* cited by examiner

*Primary Examiner*—John Rivell
(74) *Attorney, Agent, or Firm*—Hovey Williams LLP

(57) ABSTRACT

Rectangular or circular vent apparatus for protecting a confined space having a vent aperture for relief of an overpressure condition is provided with each including vent structure having a vent unit adapted to be positioned over the vent aperture in normal closing relationship thereto. Each vent unit preferably includes at least one spring steel panel, or spring steel leaves positioned against a metal sheet, provided with a movable pressure relief portion having an initial position extending across the vent aperture. A backstop is provided for arresting the degree of movement of the spring steel. The spring steel panel or the spring steel leaves have a sufficient modulus of resilience and elasticity to cause the relief portion of the spring steel panel or the metal sheet to return to their respective initial positions from the open positions thereof upon relief of the overpressure condition in the confined space.

33 Claims, 10 Drawing Sheets

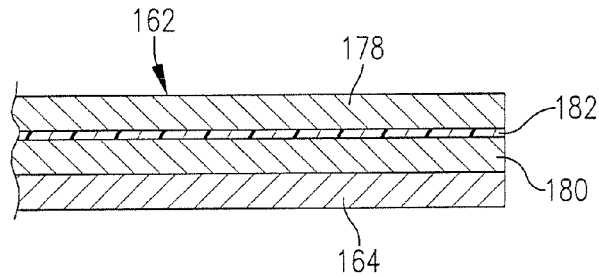
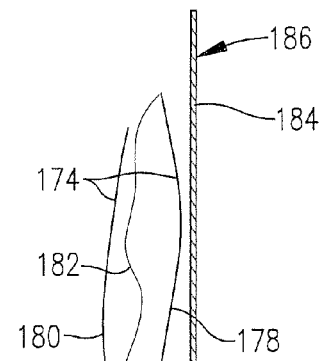
FIG.9.
FIG.10.
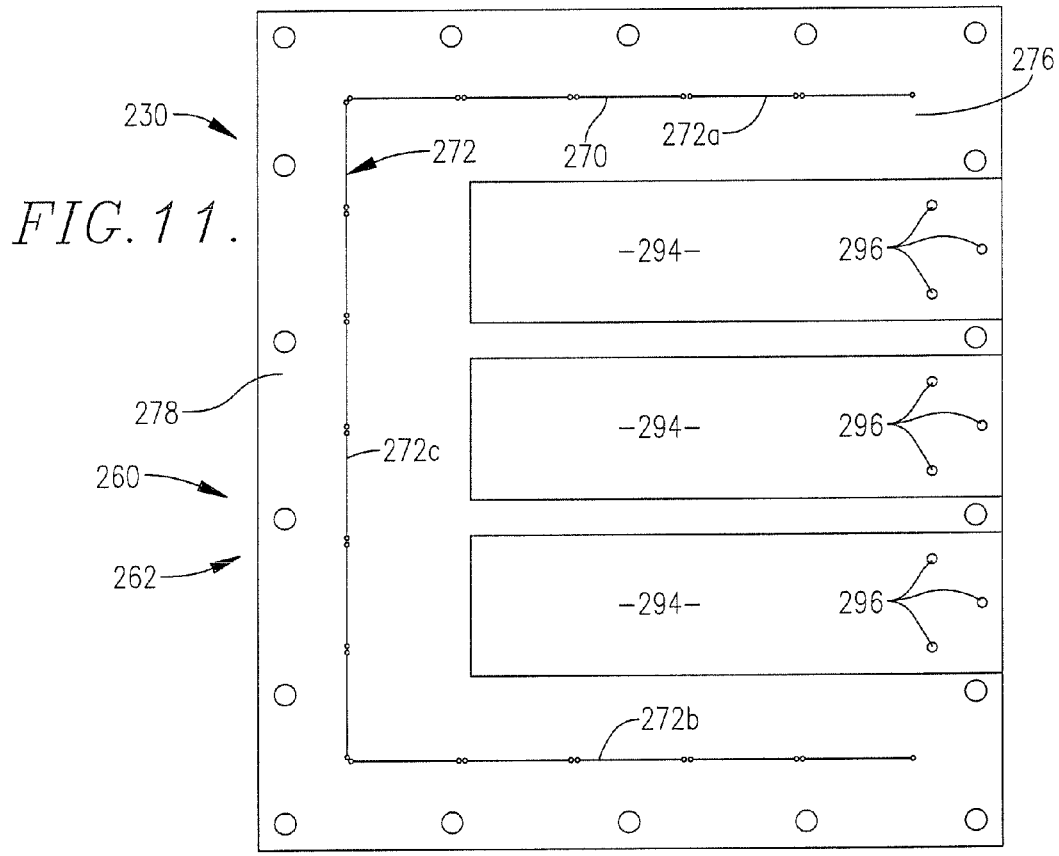
FIG.11.

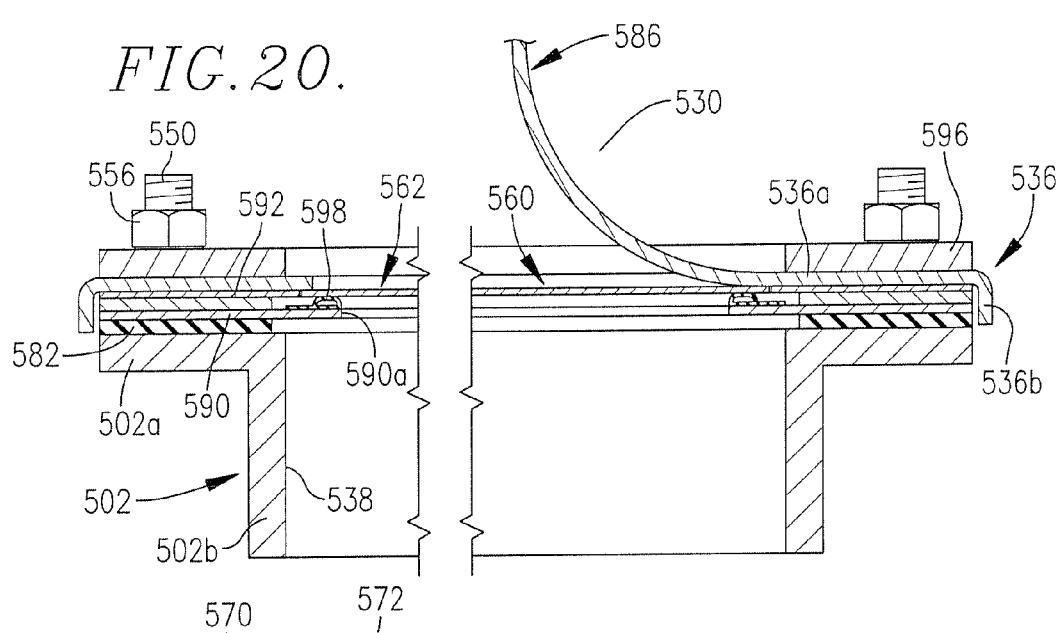
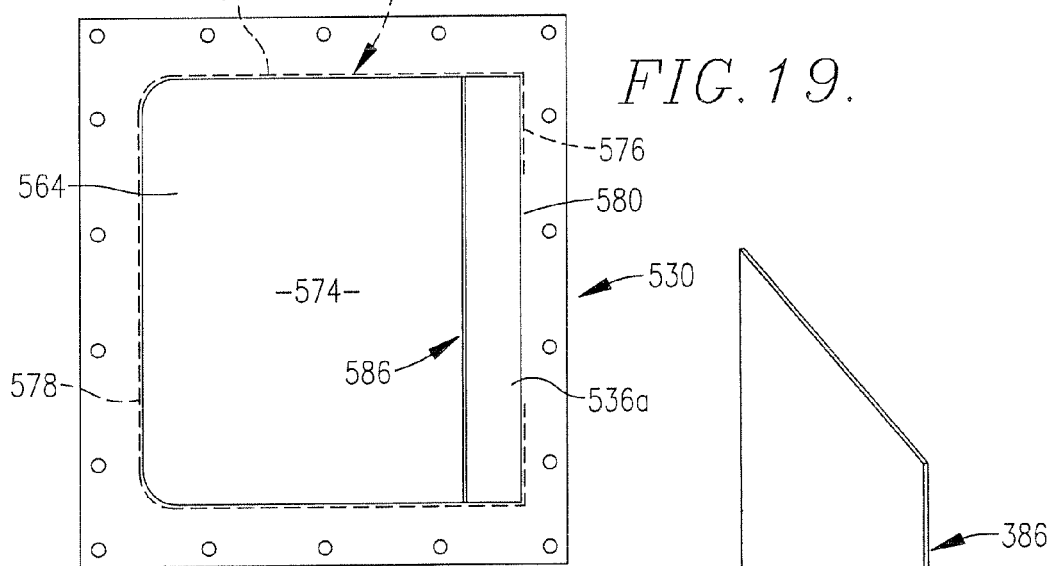
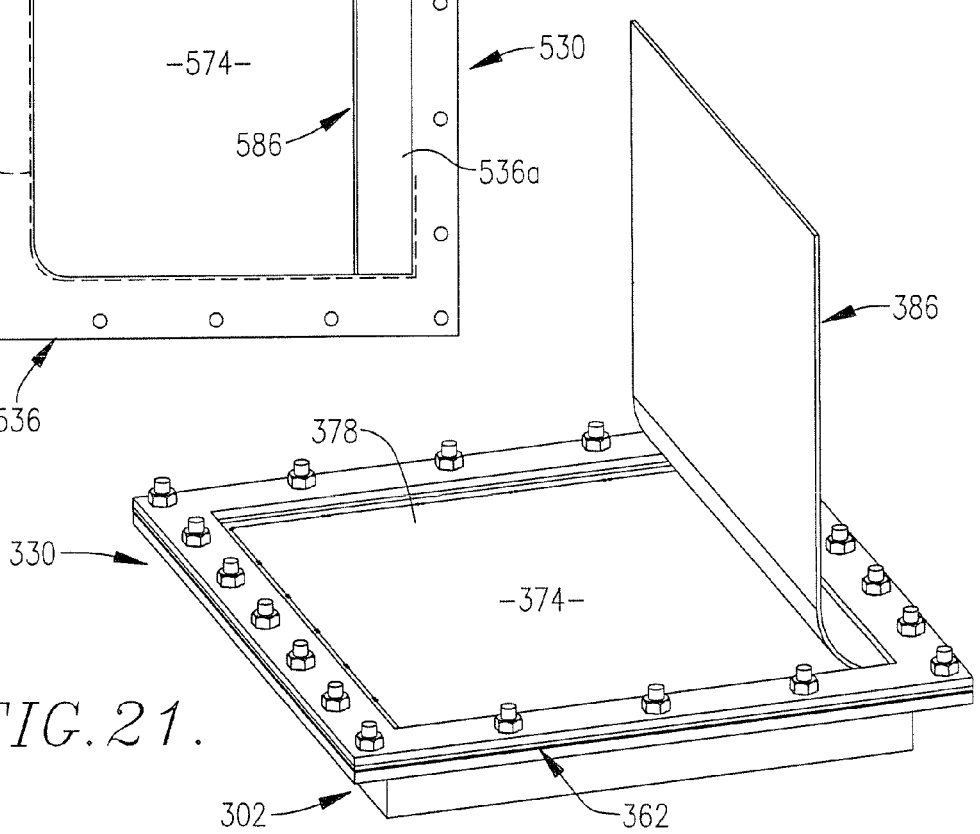

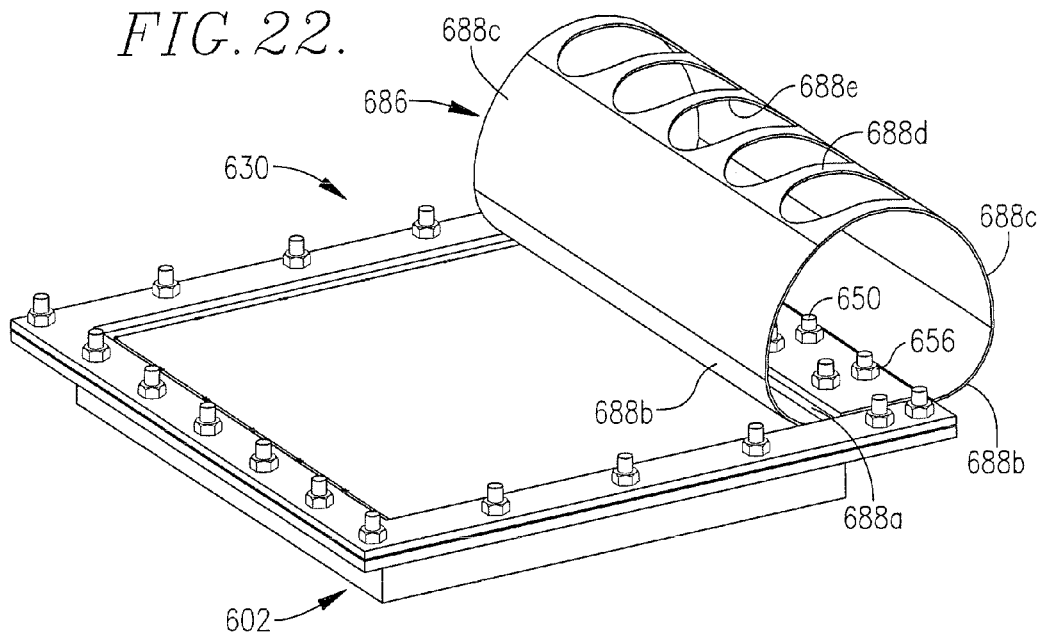
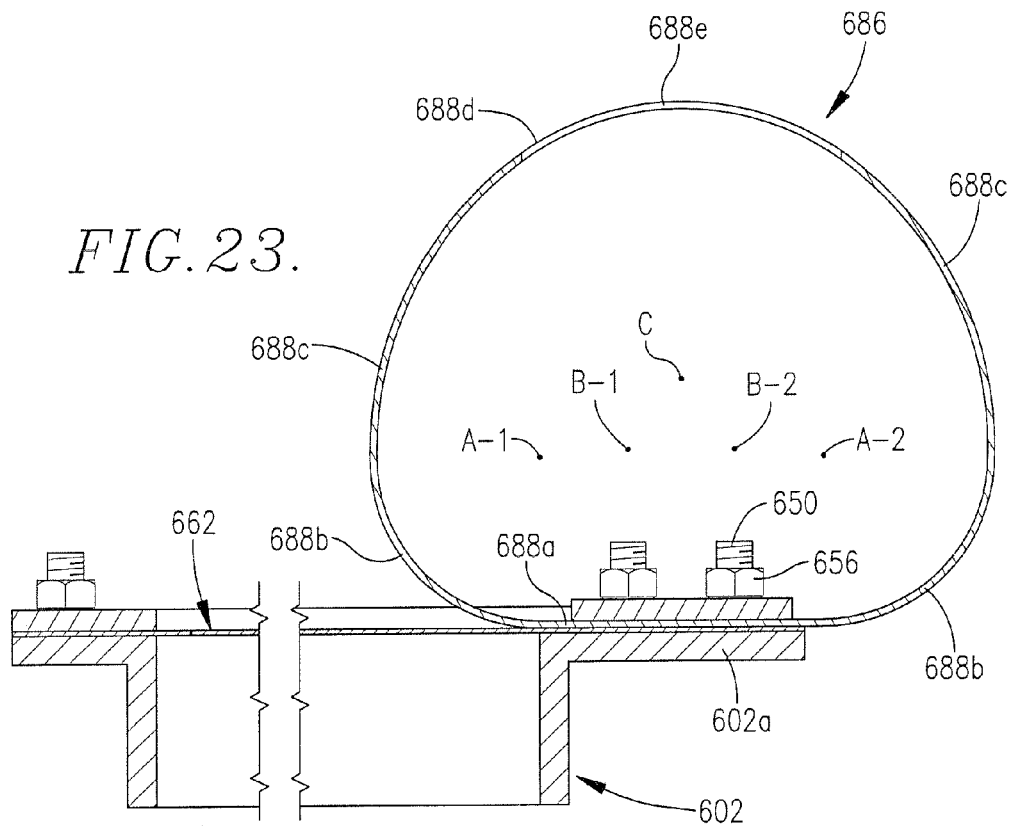

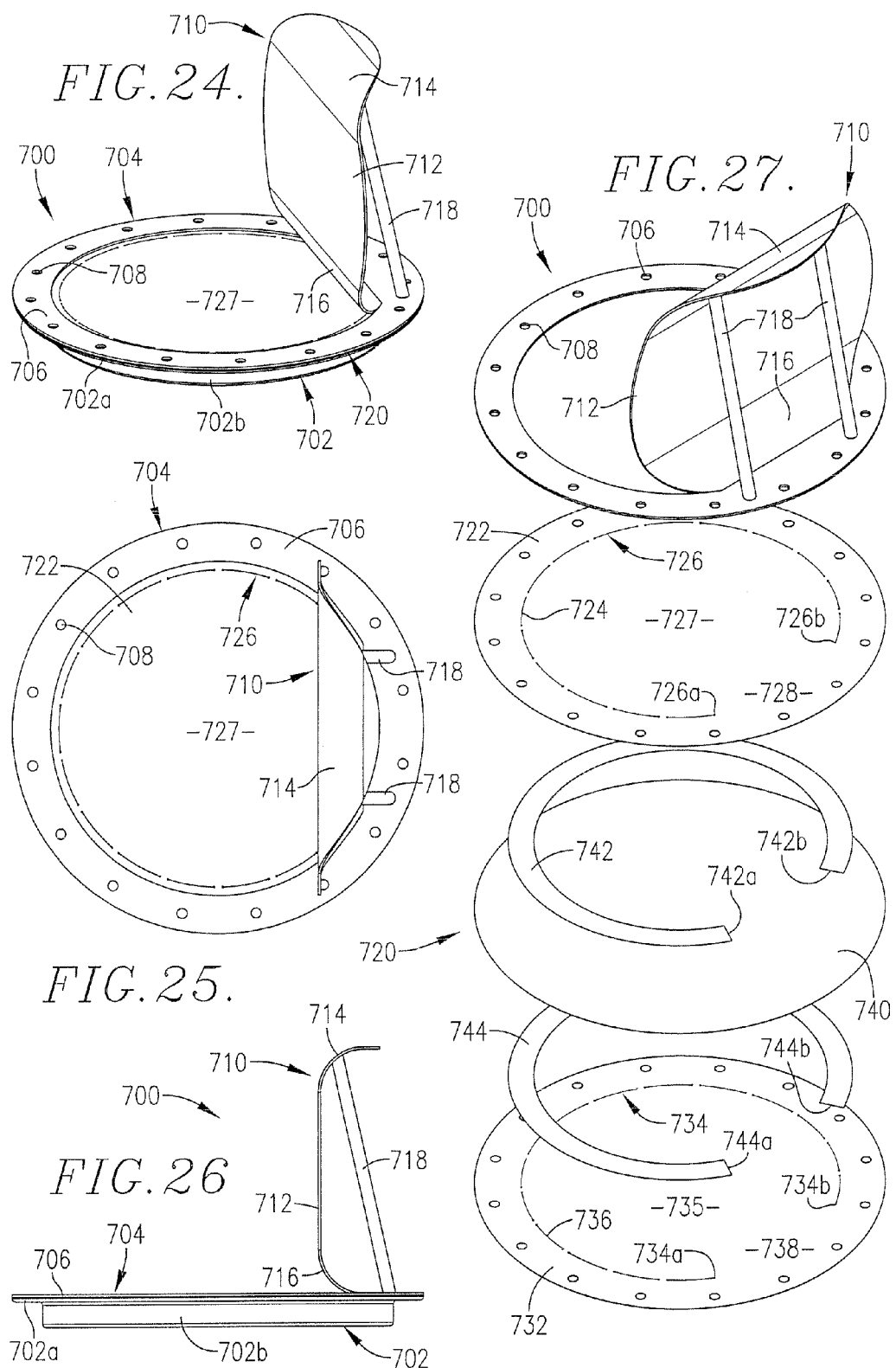

SPRING STEEL HIGH OVERPRESSURE VENT STRUCTURE

CROSS-REFERENCE TO RELATED APPLICATION

This application is a continuation-in-part of U.S. patent application Ser. No. 11/465,257, filed Aug. 17, 2006, entitled SPRING STEEL HIGH OVERPRESSURE VENT STRUCTURE, incorporated by reference herein.

BACKGROUND OF THE INVENTION

1. Field of the Invention

The present invention relates to generally rectangular or circular vent apparatus for protecting a confined space having a vent aperture for relief of a high overpressure condition. The vent apparatus is especially useful for covering relief openings in enclosures subject to rapid pressure build-ups such as may occur during explosions or uncontrolled combustion events in bag houses, duct work communicating with the bag houses, processing equipment, duct work leading to and from the processing equipment, buildings, pressure vessels, and other types of commercial and industrial installations where explosions or uncontrolled combustion events producing high overpressures may occur.

More particularly, the invention concerns vent apparatus of overall rectangular or generally circular configuration that will vent the confined space when an excessive overpressure of predetermined magnitude is exerted on the vent apparatus, and that will then reclose upon relief of the pressure to:

eliminate or reduce the ingress of air and thereby oxygen, thus mitigating the effects of a secondary explosion if the protected area remained exposed to the surrounding atmosphere via the vent opening;

prevent continuation of combustion of process materials that could cause permanent damage to the protected installation;

improve suppression of flames/fire, where inert gas, water mist, or the like, is used as an extinguishment agent, by virtue of the fact that the resulting combustion gases/flames cannot escape through venting holes; and reduce/eliminate contamination of the protected process zone.

The vent structure adapted to be mounted over a vent aperture of a confined space to be protected from a high overpressure condition includes a vent unit having a spring steel panel provided with a movable pressure relief portion defined by a line of weakness that will give way and allow the relief portion to open under a predetermined overpressure. As soon as the overpressure is relieved, the modulus of resilience and elasticity of the spring steel is sufficient to cause the pressure relief portion to return to its initial position, thereby closing the vent aperture. A backstop, which is either rectangular or circular depending upon the overall shape of the vent apparatus, extends outwardly from the vent and is provided for arresting movement of the relief portion of the spring steel panel to a selected opening position when a predetermined overpressure is applied against the relief portion of the vent unit of the vent structure, thereby preventing excessive bending of the relief portion when the vent unit of the vent structure experiences a high overpressure as the result of an explosion or other untoward pressure conditions. The backstop preferably has a curved surface adjacent to and outwardly of the relief portion of the vent unit, as well as a curved surface at the upper end thereof extending away from the main body of the backstop. The backstop is positioned to prevent the relief portion of the vent opening to an extent that the elastic limit of the spring steel metal is exceeded. Further, the two curved surfaces of the backstop function to progressively decrease, absorb, and dampen kinetic energy created by the rapidly moving relief portion during opening until kinetic energy is dissipated when movement of the relief portion of the vent is stopped by engagement of the backstop as opposed end segments thereof bend about respective spaced curved surfaces.

2. Description of the Prior Art

Explosion vents traditionally have been provided with a rupturable sheet of metal that has score lines or interrupted slits that define a line of weakness presenting the relief area of the vent. The amount of overpressure required to open the relief area of the vent is determined by, among other things, the type, thickness, and physical properties of the metal selected for fabrication of the explosion vent, the shape and nature of the line of weakness, the location of the line of weakness in the overall area of the vent, and oftentimes the provision of a series of spaced cross-tabs overlying the line of weakness in predetermined relative dispositions.

An exemplary explosion vent of this type is shown and described in U.S. Pat. No. 6,070,365, wherein a rectangular pressure relief panel is mounted in a frame adapted to be secured across a pressure relief opening. The unitary relief panel is formed from a single sheet of steel, stainless steel, Inconel, or other similar metal, and has a three-sided line of weakness defined by a plurality of interrupted slits. The series of spaced rupture tabs positioned over the line of weakness as shown in the '365 patent, must rupture before the relief area of the panel gives away under a predetermined high overpressure resulting from an explosion or a fast-burning fire.

U.S. Pat. No. 5,036,632 is another example of a conventional rectangular metal sheet explosion vent that has a three-sided line of weakness defined by interrupted slits. A layer of synthetic resin material or the like may be provided in covering relationship to the line of weakness slits. Rupturable tabs are also provided in the type of vent shown and described in the '632 patent that must break before the central section of the panel ruptures along the slit line to relieve an overpressure. An elastomeric sealing gasket or gaskets may be provided around the periphery of the rupturable metal sheet.

U.S. Pat. No. 4,498,261, referred to in the disclosure of the '632 patent, is a rectangular vent panel that opens under a relatively low pressure in which the thin sheet structure is described as being medium impact polystyrene, a relatively soft metal such as aluminum alloy, or a fully annealed stainless steel. Interrupted X-pattern slits extend through the vent panel and define individual lines of weakness that terminate at the apex of the X. A thin sealing membrane having the same area as the rupture panel is adhesively bonded to the rupture panel, and may be formed of polyethylene, stainless steel, or aluminum. Similar structure is shown and described in U.S. Pat. No. 4,612,739.

Although prior art pressure relief vents of the type described do satisfactorily open and relieve predetermined overpressure condition in protected spaces, these vents have remained open, thereby allowing the confined space to have continuing access to the surrounding atmosphere. Following outrush of products of combustion from the explosion or fire and relief of the high pressure, oxygen from the atmosphere is immediately available through the vent aperture that can produce a secondary explosion, exacerbation of a fire, or re-ignition of the fire.

More particularly, there has been a long-felt, but previously unfulfilled, requirement for vents that may be used with either rectangular or circular vent openings.

SUMMARY OF THE INVENTION

The present invention relates to rectangular or generally circular vent apparatus adapted to be mounted in closing relationship over a vent aperture of a space that requires protection from an overpressure condition resulting from an explosion or an uncontrolled fire. The vent apparatus has a vent unit provided with at least one spring steel panel having a line of weakness defining a movable pressure relief portion of the panel. In a preferred rectangular embodiment, the line of weakness is generally of U-shaped configuration defined by a series of spaced, end-to-end slits in the panel. The line of weakness has a pair of opposed leg segments presenting a hinge area of the panel therebetween, and a bight segment remote from the hinge area. Preferably, an elastomeric layer included in the vent unit covers the slits. In another embodiment, the vent apparatus is of circular configuration, and therefore is adapted for mounting in closing relationship over a circular vent aperture. The circular vent apparatus has an annular frame member that supports a vent unit having a spring steel panel provided with a movable pressure relief portion defined by spaced end-to-end slits presenting a substantially C-shaped line of weakness. The slits defining the line of weakness in the vent unit are covered with an elastomeric material. The C-shaped line of weakness is strategically located such that the central pressure relief portion of the circular vent unit is of maximum area in relationship to the inner diameter of the annular support frame member. The circular vent apparatus is also provided with a backstop extending outwardly from the annular frame member for limiting movement of the spring steel pressure relief portion of the circular vent unit to an extent that the modulus of elasticity of the spring steel is not exceeded during opening of the pressure relief portion. The backstop for the circular vent apparatus differs from the backstop for the rectangular vent apparatus only in that it is of circular configuration, rather than being rectangular.

The spring steel material used for fabrication of the panel of each of the vent units is of a thickness such that a pressure relief portion of the vent unit will open rapidly when a predetermined pressure is applied, yet returns to its initial position closing the vent aperture as soon as the pressure is relieved. The spring steel is preferably a stainless product 0.05 to 3 mm thick, with a preferred thickness being 0.5 mm. The opening pressure of the pressure relief portion of the vent unit is a function not only of the type of spring steel material, but also the thickness of the product, the overall dimensions of the vent unit, and the nature of the line or lines of weakness in the panel, such as the size and length of the slits defining the line of weakness and the distance between adjacent ends of the slits. Alternatively, the line of weakness may be a score line in the spring steel panel.

When a predetermined overpressure occurs in the protected space sufficient to open the pressure relief portion of either the rectangular or circular vent units, the relief portion thereof bends about a respective hinge area to immediately relieve the build-up of pressure in the protected area. The backstop extending away from the relief portion of the vent serves to arrest movement of the relief portion to an extent during opening thereof that does not exceed the elastic limit of the spring steel material from which the vent structure is fabricated. The modulus of resilience and elasticity of the relief portion of the spring steel panel while in its open position is sufficient to cause the relief portion to immediately return to its initial position across the vent aperture to prevent significant exposure of the protected area to the surrounding atmosphere following relief of the overpressure condition by the vent apparatus. When high overpressure events occur, as for example is the case with a violent explosion, engagement of the relief portion of the vent unit with the backstop may result in deflection of the backstop to a certain degree. The backstop deflection is believed to further contribute to absorption, dampening, and dissipation of kinetic energy in the moving relief portion of the vent unit, thereby assuring that the elastic limits of the spring steel material are not exceeded which could result in separation of the pressure relief portion of the vent unit from its surrounding body portion.

An important aspect of the present invention is the ability of the spring steel pressure relief portion of each of the vent units to open under a predetermined overpressure condition, then return to its original vent aperture closing position upon pressure relief, and that may also deflect inwardly under a vacuum that may occur following the overpressure, and thereafter return to its original closing position upon normalization of the vacuum.

In certain embodiments of the vent apparatus, the vent structure includes a composite laminated vent unit that is provided with a plurality of superimposed components with one of the components being a spring steel panel having an U-shaped relief portion defined by a line of weakness in the panel. Another component of the laminated vent unit may comprise a non-spring steel metal sheet also having a line of weakness at least generally aligned with the line of weakness in the spring steel panel. The difference between the yield point and tensile strength of the non-spring steel metal sheet is substantially greater than the difference between the yield point and tensile strength of the spring steel panel. The lines of weakness are preferably each defined by a series of spaced, end-to-end slits, and a sheet of synthetic resin material is interposed between the spring steel panel and the non-spring steel metal sheet to close the line of weakness slits.

The backstops, which extend away from the movable pressure relief portions of the vent units, are preferably at an angle of about 900 with respect to the relief portion in its initial position thereof overlying the vent aperture. Each backstop preferably has an inner curved surface adjacent to and facing the relief portion of the vent, an intermediate section, and an outer curved surface extending in a direction away from the relief portion of the vent. The central section of each backstop between the inner and outer curved surfaces is of generally planar configuration, or may be slightly bowed toward the relief portion of the vent structure, if desired. The rectangular backstop is of a length approximately equal to the length of the pressure relief portion of the vent unit. Similarly, the backstop of the circular vent apparatus is of a diameter approximating that of the relief portion of the circular vent unit.

The innermost transversely curved section of each backstop adjacent the hinge area of the pressure relief portion of a respective vent unit provides a smooth transition zone for bending of the pressure relief portion of the vent unit during opening thereof under a predetermined high pressure. As the relief portion of the vent structure opens under a predetermined overpressure, the relief portion engages and conforms to the adjacent surfaces of the backstop. The curved surfaces of the backstop, and particularly the outermost curved surface remote from the relief portion of the vent structure, cooperate to absorb and more progressively control the kinetic energy gradient of the relief portion during opening until the relief portion has fully engaged the backstop, than would be the case if the backstop was essentially flat without opposed curved surfaces.

Each backstop serves to prevent the pressure relief portion of a respective vent unit from being opened under a predetermined overpressure through an arc that would result in the panel material exceeding the yield strength of the spring steel precluding the pressure relief portion from immediately returning to its initial position substantially closing the vent aperture, after opening of the pressure relief portion.

An alternate backstop for the rectangular vent apparatus may be of tubular, generally oval configuration having a curved segment presenting a curvilinear outer surface positioned to arrest movement of the relief portion of the vent unit to its selected open position. The curved segment of the tubular backstop has a curvilinear outer surface portion of greater curvature adjacent the relief portion of the stainless steel panel than an adjacent curvilinear outer surface portion of the tubular backstop. The outermost portion of the tubular backstop preferably has a series of openings therein allowing access to connectors that serve to affix the backstop in predetermined disposition with respect to the pressure relief portion of the spring steel panel. The curved surface of the tubular backstop also contributes to absorption and dissipation of kinetic energy during opening of the relief portion of the vent structure.

Rectangular vent apparatus having a tubular backstop is especially advantageous for use in certain installations, because of its lower overall height in a direction away from the spring steel panel and the ability to use the tubular backstop with a number of different sized panels.

BRIEF DESCRIPTION OF THE DRAWINGS

FIG. 9 is an enlarged fragmentary cross-sectional view of a portion of an alternate vent unit illustrating the laminar components thereof;

FIG. 10 is a longitudinal cross-sectional view of vent apparatus incorporating the alternate vent unit of FIG. 9, illustrating the pressure relief portions of the vent unit shown in FIG. 9 in the open positions thereof, with the movable pressure relief portion panel having returned to its initial position following opening thereof under a predetermined overpressure;

FIG. 11 is a plan view of another alternate embodiment of a vent unit and illustrating a series of spring steel leaves engaging the pressure relief portion of a non-spring steel metal sheet that normally overlie the vent aperture of a confined space, with the leaves being operable to return the pressure relief portion of the non-spring steel metal sheet to the initial position thereof after relief of overpressure in a confined space;

FIG. 19 is an enlarged, fragmentary, vertical cross-sectional view of alternate vent apparatus having an outwardly-directed backstop for restricting open of the pressure relief portion of the vent unit;

FIG. 20 is a reduced size plan view of the vent apparatus as shown in FIG. 19, without the top rectangular holddown frame;

FIG. 21 is a perspective view of the vent apparatus as shown in FIG. 15;

FIG. 22 is a perspective view of vent apparatus having an alternate backstop structure for the pressure relief portion of the vent unit;

FIG. 23 is a fragmentary enlarged longitudinal cross-sectional view of the vent apparatus shown in FIG. 22;

FIG. 24 is a perspective view of circular vent apparatus in accordance with this invention;

FIG. 25 is a plan view of the circular vent apparatus as shown in FIG. 24;

FIG. 26 is a generally schematic side view of the circular vent apparatus as illustrated in FIGS. 24 and 25; and FIG. 27 is an exploded view of the vent apparatus of FIGS. 24 and 26, excluding the bottom mounting frame of the apparatus.

DETAILED DESCRIPTION

Figure 1:
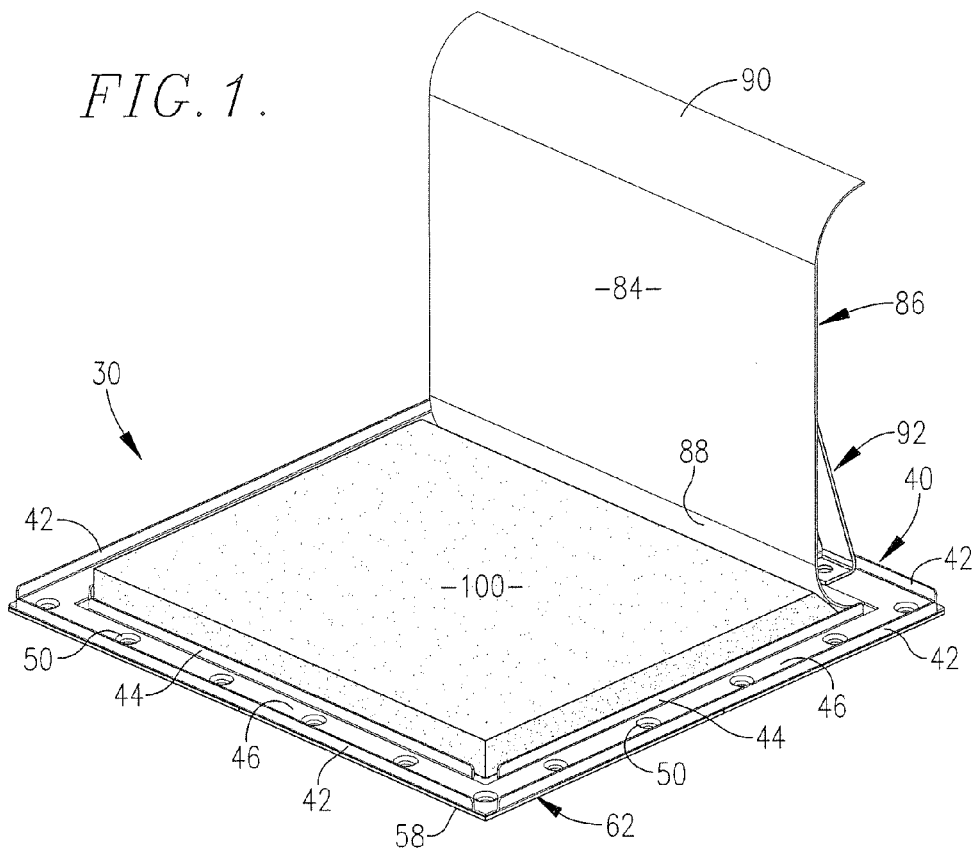
FIG. 1 is a perspective view of the preferred embodiment of the vent apparatus of this invention that includes vent structure, and a frame assembly for the vent structure having an outwardly-directed, dual curved backstop for the movable pressure relief portion of the vent unit of the vent structure.
Figure 5:
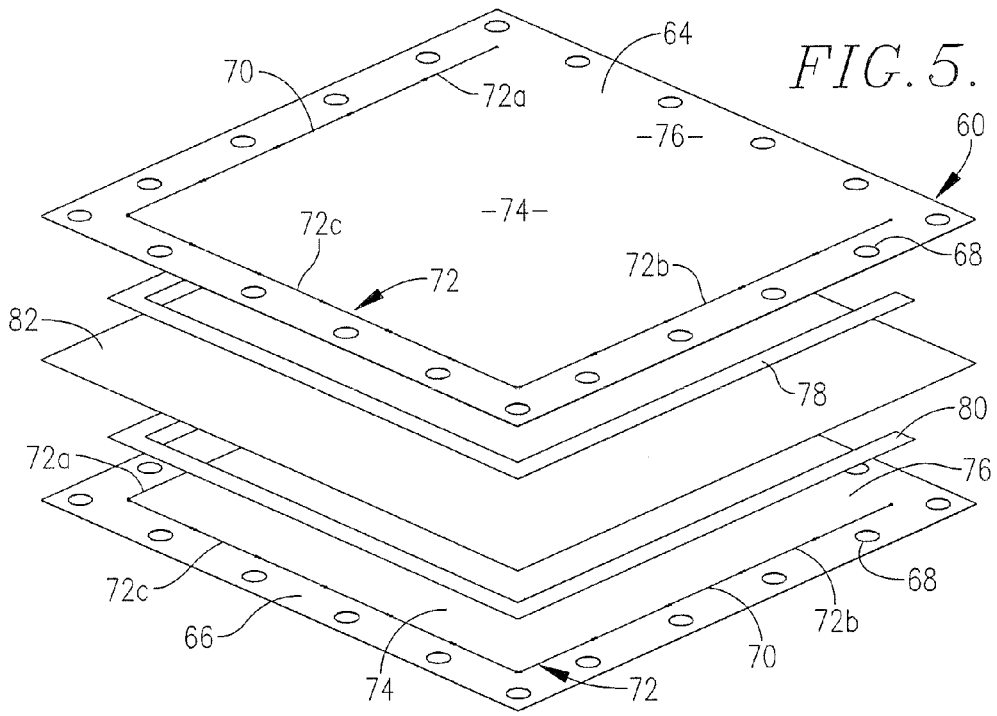
FIG. 5 is an exploded perspective view of the vent unit forming a part of the vent apparatus of FIG. 1.

The preferred rectangular vent apparatus of this invention is illustrated in FIGS. 1-7 and designated generally by the numeral 30. Apparatus 30 is adapted to be mounted in normal closing disposition to the vent aperture 32 of structure 34 (FIG. 6) presenting an area requiring protection from an untoward overpressure event. It is to be understood in this respect that the vent apparatus 30 of this invention may be supplied to a user in the form shown in FIGS. 1-7, or in conjunction with alternate frame supports, as for example shown in FIGS. 15, 17, and 20-22.

A rectangular metal frame element 36 may, for example, be mounted on and secured to structure 34 in surrounding relationship to vent aperture 32. The internal opening 38 of frame element 36 is generally aligned with the vent aperture 32 in structure 34. A frame unit 40 of vent apparatus 30 is mounted on frame element 36 and the underlying structure 34. Frame unit 40 has four out-turned, lip portions 42 and 44 spaced from one another and that are unitary with rectangular base portion 46. A series of in-turned annular flanges 48 define respective openings 50 for receiving studs 52 secured to frame element 36, and that extend through and project outwardly from the outer face of base portion 46 of frame unit 40. A nut 54 is threaded over each stud 52 and engages a washer 56 resting against the outer surface of base portion 46 of frame unit 40. A segmented, rectangular, elastomeric gasket 58, preferably of silicone rubber or the like, is located between frame element 36 and base portion 46 of frame assembly, and has a series of openings therein for receiving respective annular flanges 48 of frame unit 40. Alternatively, bolts extending through structure 34, frame element 36, and base portion 46 of frame unit 40 may be provided for securing frame unit 40 to structure 34. Nuts 54 threaded over respective studs 52 serve to securely affix frame unit 40 and thereby the apparatus 30 to structure 34 in alignment with a corresponding vent aperture 32.

Vent structure 60 of apparatus 30 includes a composite, laminated unit 62 (FIG. 5) made up of a spring steel panel 64 and a second spring steel panel 66, both of the same size, and of outer dimensions substantially corresponding to the width and length dimensions of frame unit 40. Suitable spring steel materials are hardened 301, 304, 316, 316L and 316LTi stainless steel. In lieu of stainless spring steel, the panels 64 and 66 may be fabricated from other spring steel metals, as for example Inconel, titanium, nickel, or Hastelloy that have been suitably hardened by rolling, tempering, and/or annealing in accordance with known metal hardening techniques. The panels 64 and 66 have a series of spaced apertures 68 located around the perimeter thereof, with the apertures 68 of panel 64 being aligned with respective apertures 68 of panel 66. Apertures 68 are located to align with corresponding openings 50 defined by annular flanges 48 unitary with base portion 46 of frame unit 40.

Spring steel panels 64 and 66 of laminated vent unit 62 each have a series of spaced, end-to-end slits 70 that cooperate to define a U-shaped line of weakness 72. The line of weakness 72 in each of the panels 64 and 66 has a pair of opposed leg segments 72a and 72b joined by an end bight segment 72c. Each line of weakness 72 defines a pressure relief portion 74 that upon opening bends about the hinge area 76 of respective panels 64 and 66, and that lies between the terminal ends of leg segments 72a and 72b of each line of weakness 72, remote from a respective bight portion 72c. It is therefore to be understood that each hinge area 76 is integral with and a unitary part of panels 64 and 66.

A relatively thin strip 78 of synthetic resin material underlies panel 64 in covering relationship to the line of weakness 72 in panel 64, while a similar relatively thin strip 80 of synthetic resin material overlies the line of weakness 72 in panel 66. A relatively thin synthetic resin sheet 82 is interposed between panels 64 and 66, and between respective strips 78 and 80. The sheet 82 may be of the same length and width dimensions as panels 64 and 66, and thereby have openings therein that align with apertures 68, or sheet 82 may be of dimensions substantially equal to the outer edges of strips 78 and 80. If of the same dimensions as panels 64 and 66, sheet 82 has openings therein that align with apertures 68 in panels 64 and 66. The strips 78 and 80 and sheet 82 preferably are fabricated of fluorinated ethylene propylene (FEP), or an equivalent, such as PTFE or PFA.

Figure 6:
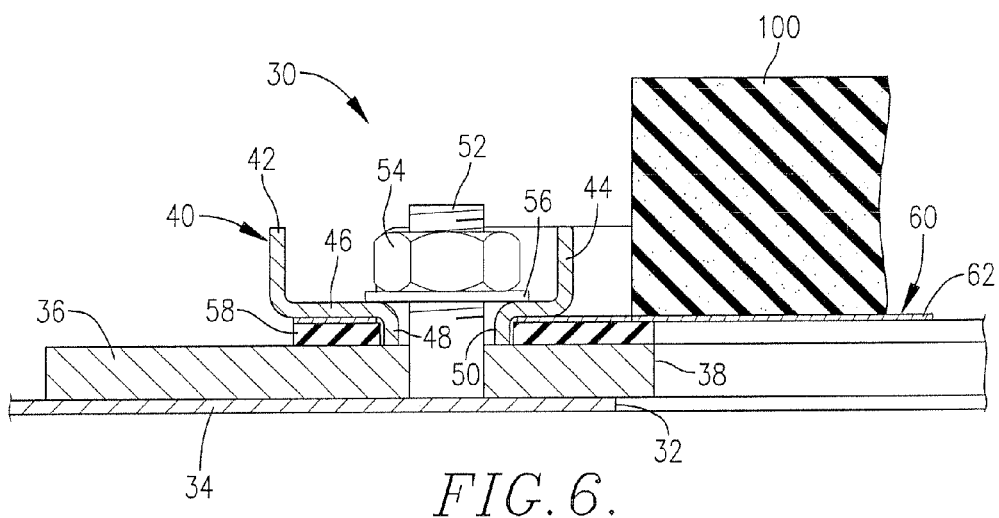
FIG. 6 is an enlarged fragmentary vertical cross-sectional view of a portion of the vent apparatus of FIG. 1.
Figure 7:
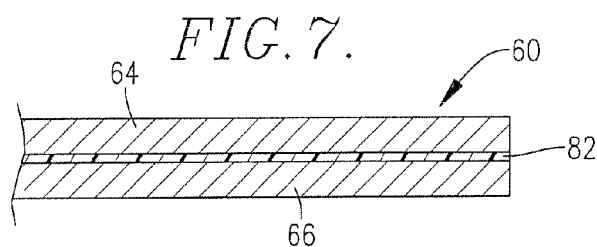
FIG. 7 is an enlarged fragmentary cross-sectional view of the vent unit of FIG. 4, without a depiction of the U-shaped elastomeric slit covers of FIG. 5.

When assembled into a composite laminated unit, as shown for example in FIGS. 1, 6, and 7, strip 78 is interposed between panel 64 and sheet 82, while strip 80 is positioned between sheet 82 and panel 66.

The outer dimensions of frame unit 40 are preferably about the same as the outer dimensions of laminated unit 62. A die cut central section 84 of frame unit 40 is bent away from the rectangular perimeter of frame unit 40 to form an outwardly-directed backstop 86. The width of central section 84 is approximately equal to the distance between leg portions 72a and 72b of line of weakness 72 while the length of section 84 is approximately equal to the length of respective leg portions 72a and 72b, and thereby the distance from the bight portion 72c of line of weakness 72 and hinge area 76. Backstop 86 has a transversely curved innermost section 88 that is unitary with the adjacent transverse segment 46a of base portion 46 of frame unit 40. The outermost edge portion 90 of backstop 86 is also bent away from the central section 84 of backstop 86 and curved in the same direction as section 88. The inner radius of curvature of curved sections 88 and 90 of backstop 86 in a preferred embodiment of vent apparatus 30 is about 50 mm. The major central section 84 of backstop 86 that extends outwardly from the rectangular perimeter portion of frame unit 40 is oriented at an angle of approximately 90° with respect to the face of panel 64. It is preferred that the central section 84 and curved section 90 of backstop 86 collectively be of a length longitudinally thereof that is approximately equal to the length of the pressure relief portion 74 of vent unit 62. Further, as shown in FIGS. 1, 3, and 4, the transverse width of curved section 88 of backstop 86 is substantially less then the length of the planar central section 84 of backstop 86 in a direction away from the panel 64.

Figure 2:
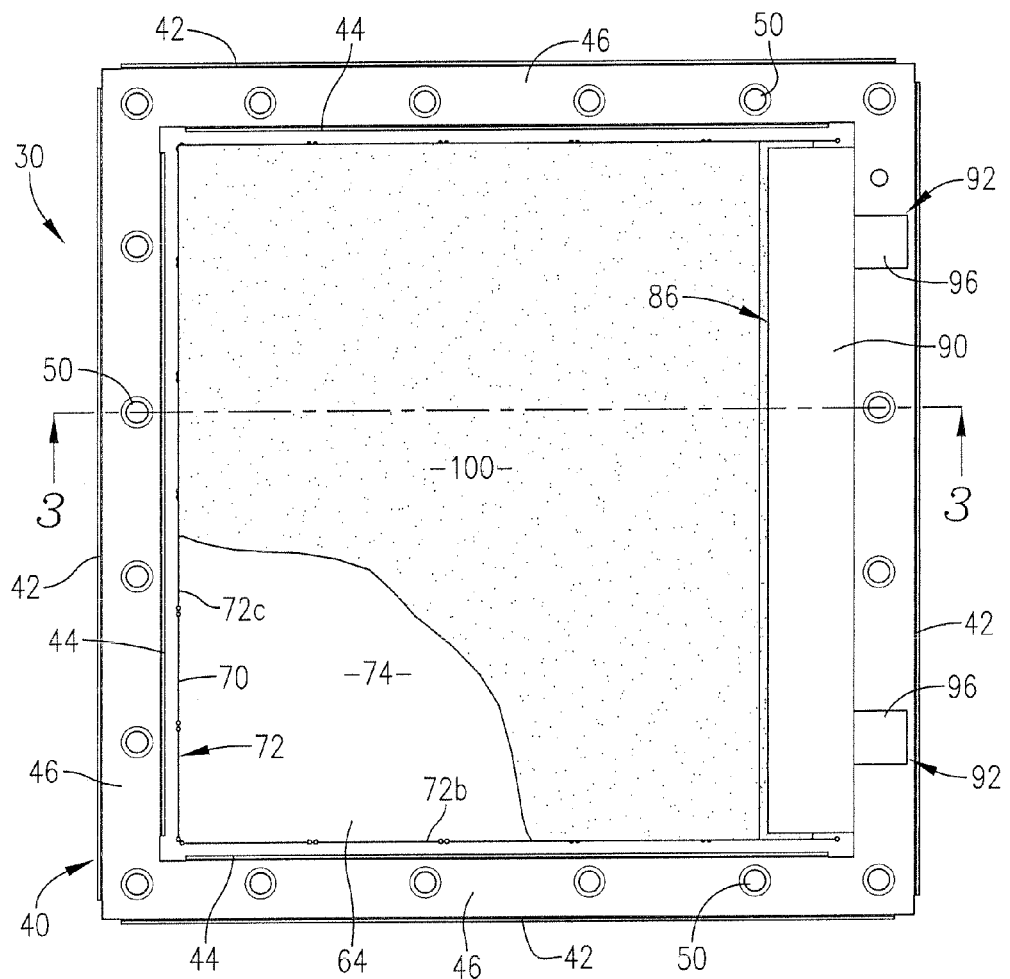
FIG. 2 is a plan view of the vent apparatus of FIG. 1, with a portion of the foam panel overlying the vent unit broken away to illustrate the slits defining a line of weakness in a panel of the vent unit.
Figure 3:
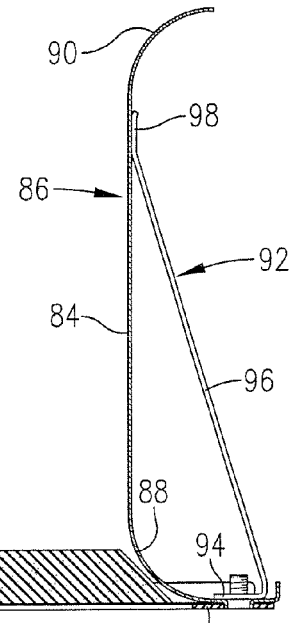
FIG. 3 is a fragmentary vertical cross-sectional view of the vent apparatus taken along the line 3-3 of FIG. 2 and looking in the direction of the arrows.
Figure 3:
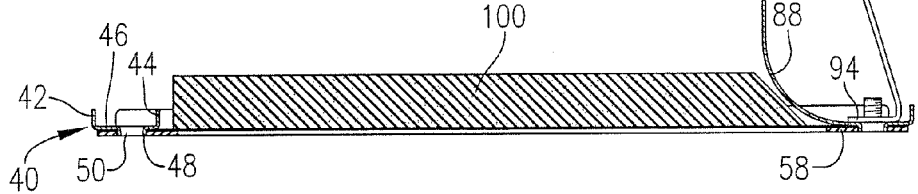
Figure 4:
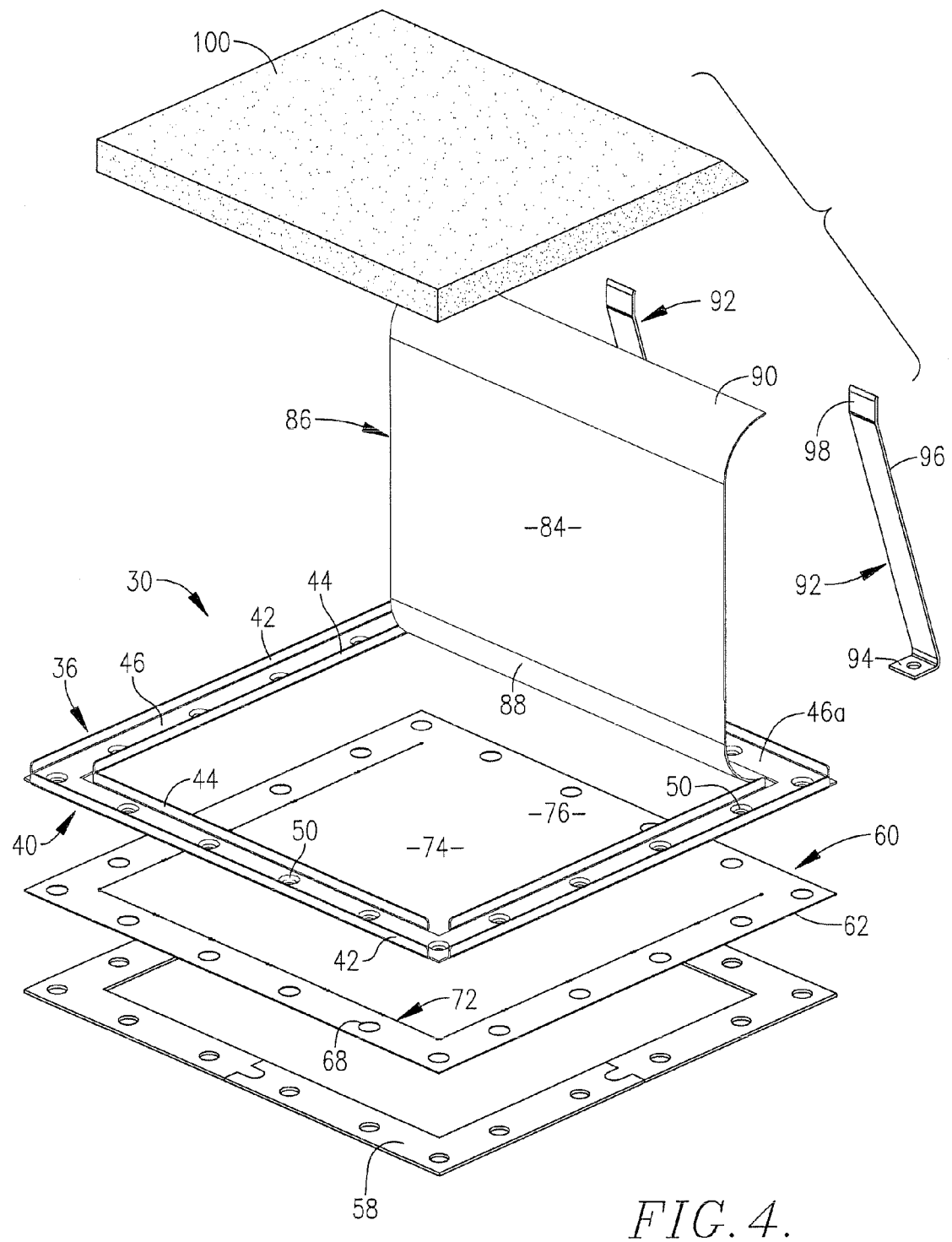
FIG. 4 is an exploded perspective view of the vent apparatus as shown in FIG. 1.

A pair of braces 92 may be provided on the normally rearmost face of backstop 86, as illustrated in FIGS. 2 and 3 to provide reinforcement for the backstop 86. As is evident from these figures, each brace 92 includes an innermost leg segment 94, secured to transverse segment 46a of base portion 46 of frame unit 40. The intermediate leg segment 96 of each brace 92 is at an angle with respect to central section 84 of backstop 86, as shown in FIG. 3. The outermost leg segment 98 of each brace 92 is attached to the adjacent face of central section 84 of back stop 86, proximal to curved section 90.

In certain applications of vent apparatus 30, it is desirable to provide a layer 100 of insulating material in overlying relationship to the outermost face of vent panel 64, to prevent condensation from collecting on the pressure relief portion 74 of vent panel 64 of vent unit 62. Insulating layer 100 may be formed of a conventional cellular foam material. The length and width dimensions of foam layer 100 are preferably approximately equal to the length and width of the pressure relief portions 74 of panel 64.

In operation, gasket 58 is placed over frame element 36 in disposition with studs 52 extending through the gasket. Vent apparatus 30 of a configuration and construction, as for example shown in FIG. 1, is then placed over frame element 36 and nuts 54 tightened to securely affix apparatus 30 to structure 34. It is to be noted that the outer margins of annular flanges 48 defining openings 50 bottom out against frame element 36 and prevent overcompression of gasket 58, at the same time, gasket 58 is compressed sufficiently to provide a seal between the interior of the protected area and the surrounding atmosphere.

When an overpressure condition within a confined space protected by vent apparatus 30 reaches a level sufficient to rupture the areas of panels 64 and 66 between the ends of adjacent slits 70 and that also severs strips 78 and 80 and sheet 82 along edges aligned with lines of weakness 72, pressure relief portions 74 of panels 64 and 66 open and bend about respective hinge areas 76. The pressure relief portions 74 of vent unit 62 move from their initial positions closing the vent aperture 32 to a selected open position with the panel 64 engaging the adjacent face of backstop 86. Backstop 86 arrests bending movement of the pressure relief portions 74 of panels 64 and 66, limits, absorbs, and dampens the kinetic energy of movement of the relief portions 74 of the vent unit 62, and thereby prevents swinging of pressure relief portions 74 through corresponding arcs that would exceed the modulus of resilience and elasticity of hinge areas 76 of panels 64 and 66. Thus, this limitation on the swinging movement of pressure relief portions 74 to approximately a 90° angle assures that the pressure relief portions 74 of the stainless spring steel panels 64 and 66 will return to their initial positions from the open positions thereof, because the modulus of resilience and elasticity of the spring steel panels 64 and 66 has not been exceeded.

The provision of the curved section 90 of backstop 86 is especially useful in absorbing and dampening kinetic energy of the pressure relief portion 74 of vent panels 64 and 66, in that the edges of panels 64 and 66 defined by bight portions 72c of line of weakness 72 are spaced furthest from hinge area 76 and therefore are moving at the greatest speed during opening of pressure relief portion 74 in response to an overpressure condition occurring within the protected are defined by structure 34.

In the event an insulating layer 100 of foam material is provided on the outermost face of vent panel 64, the layer 100 compresses against the adjacent face of backstop 84. Layer 100 functions to further reduce the kinetic energy generated during opening of the pressure relief portions of vent unit 62. As a result, layer 100 contributes to avoidance of pressure relief portions 74 of vent panels 64 and 66 taking on a set that would preclude the pressure relief portions 74 from returning to their initial positions closing aperture 32 after pressure relief has been obtained.

The spring steel material from which panels 64 and 66 are fabricated is preferably a steel wherein the difference between the yield point and tensile strength of each spring steel panel is no more than about 300 N/mm$^2$ Preferably, the yield point and tensile strength of the spring steel material is at least about 1200 N/mm$^2$ and 1450 N/mm$^2$, respectively. Stainless spring steel is preferred because of its corrosion resistance. The yield point and tensile strength of the spring steel have been increased by thermal hardening or hard rolling or both. Annealing and tempering of the metal may be carried out to obtain the required yield point and tensile strength of the spring steel.

Exemplary spring steel materials useful in fabrication of vent unit 62 of vent apparatus 30 are available from Precision Metals M.V. B-2800 Mechelen, BE, including stainless steel austenitic 1.4310 C1300-hard rolled EN10088-2 having a tensile strength of 1404-1463 N/mm$^2$, a hardness of 431-446 HV, and an elongation (A80 mm %) 11.5-16.5; EN10151 AMS 5519 having a tensile strength of 1440-1460 N/mm$^2$, a hardness of 465-468 HV, and an elongation (A80 mm %) 13-16; and EN10151 types having (a) a tensile strength of 1325 N/mm$^2$, a hardness of 403 HV, and an elongation (A80 mm %) A50:9; (b) a tensile strength of 1412-1428 N/mm$^2$, a hardness of 429-431 HV, and an elongation (A80 mm %) 1.2; (c) a tensile strength of 1397 N/mm$^2$, a hardness of 423 HV, and an elongation (A80 mm %) A50:4; (d) a tensile strength of 1410-1414 N/mm$^2$, a hardness of 400-402 HV, and an elongation (A80 mm %) 1.4; and (e) a tensile strength of 1380-1382 N/mm$^2$, a hardness of 441 HV, and an elongation (A80 mm %) 16-18. A particularly useful stainless spring steel material is C1300 having a tensile strength of 1350 to 1500 N/mm$^2$ and a thickness of 0.05 to 3 mm, and preferably 0.5 mm. Desirably, the strips 78 and 80 and sheet 82 are of fluorinated ethylene propylene (FEP), or alternatively, polytetrafluoroethylene (PTFE), or perfluoroalkoxy polymer (PFA), with each strip and the sheet having a thickness of about 0.250 mm and preferably from about 0.0125 mm to about 0.30 mm. Typical vent apparatus 30 including the vent unit 62 may, for example, be 420 mm wide by 475 mm long. The backstop 86 of that vent structure 60 may, for example, be extend from the face of panel 64 in an outward direction therefrom about 310 mm.

After overpressure burst pressure specifications have been established for the vent unit 62 of vent apparatus 30, the particular materials including dimensions for fabrication of vent unit 62 are determined and a line of weakness 72 formed in the metal panels that will assure full opening of the pressure relief portions 74 of the panels at the specified overpressure. In certain instances, and in accordance with accepted industrial practices, empirical tests may be carried out to confirm that a particular selection of components and the fabrication parameters therefor will result in vent structure that, in fact, will open at a predetermined overpressure, whereupon vent structures to be delivered to customers will then be manufactured in accordance with and pursuant to the results of the test data.

FIG. 3 is a cross-sectional, generally schematic depiction of the vent apparatus 30 in its normal operational position protecting a confined zone from an untoward overpressure caused by an explosion or fast burning fire as examples. The pressure relief portions 74 of panels 64 and 66 of vent unit 62 fully open immediately about respective hinge areas 76 to relieve the high pressure in the protected area. The backstop 86 serves to limit and arrest the degree of swinging movement of pressure relief portions 74 about respective hinge areas 76 as a result of engagement of the outer surface of panel 64 with the backstop 86. The transversely curved inner section 88 of backstop 86 is strategically located relative to the adjacent hinge area 76 of panel 64 to cause the pressure relief portions 74 of panels 64 and 66 to conform to the curved shape of inner section 88. The smooth transition curvature of inner section 88 of backstop 86 prevents the hinge areas 76 of the pressure relief portions 74 of vent panels 64 and 66 from bending about crease lines that would tend to cause separation of pressure relief portions 74 from their respective panels 64 and 66 as a result of the high forces imposed on the hinge areas 76 of panels 64 and 66 during high pressure actuation and opening thereof. The curvature of innermost section 88 of backstop 86 also provides a uniformly curved surface for smoothing out the kinetic energy created during opening of the panels. Likewise, bending of the outer margin of pressure relief portions 74 of vent panels 64 and 66 about the curved surface of section 90 of backstop 86 contributes to absorption, dampening, and smoothing out of kinetic energy from opening of the pressure relief portions 74 and prevents the spring steel material from exceeding its yield point and tensile strength to an extent that would prevent the pressure relief portions 74 of spring steel panels 64 and 66 from returning to their initial positions, as shown for example in FIGS. 1 and 6.

Figure 8:
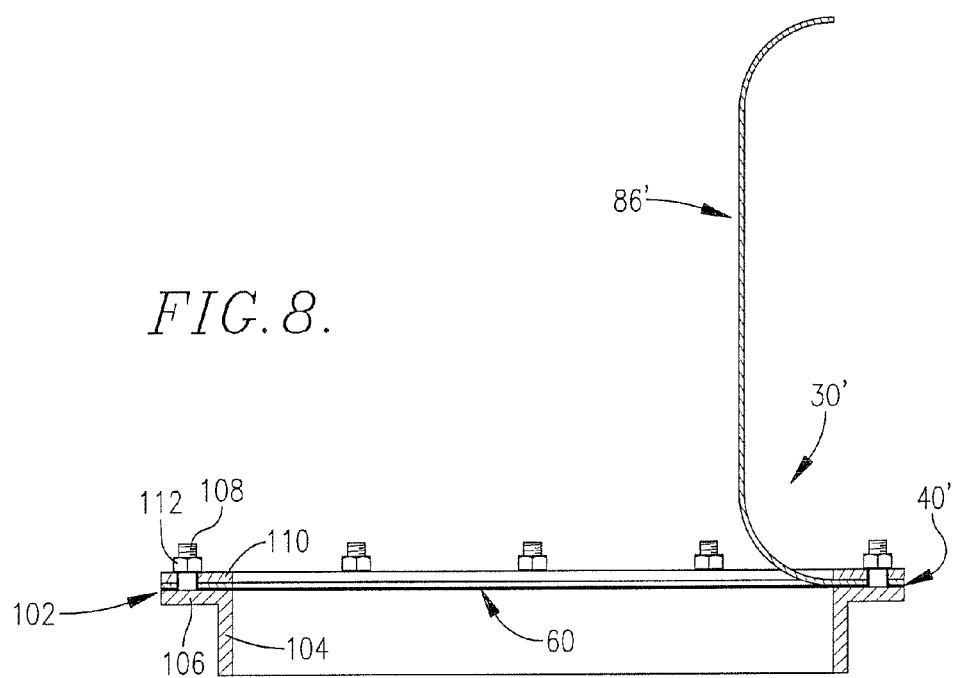
FIG. 8 is a vertical cross-section view of alternate frame members for the vent apparatus of FIG. 1.

The vent apparatus 30' shown in FIG. 8 differs from apparatus 30 only in the provision of a conventional, rectangular, transversely L-shaped frame 102 adapted to be connected to structure 34 in alignment with an aperture 32. Frame 102 serves as an alternate to frame element 36 of FIG. 6 and has four outwardly-directed legs 104 that are perpendicular to a wall structure, such as structure 34, as well as four legs 106 that are perpendicular to respective legs 104. Legs 106 of frame 102 are therefore essentially equivalent to the frame element 36, as shown in FIG. 6. Studs 108 secured to and extending away from legs 106 and pass through apertures therefor in the vent unit 62. A flat, rectangular frame member 110 overlies the perimeter edge of vent unit 62 and frame unit 40' and is secured in place by nuts 112 on each of the studs 108. It is to be understood that frame member 110 has a series of annular flanges similar to flanges 48 that define the openings for receiving studs 108, and that rest against the adjacent surface of leg 106 of frame 102. A rectangular elastomeric seal gasket, such as gasket 58, also would be provided in most instances between leg 106 of frame 102 and the proximal surface of the panel 66 of vent unit 62. The frame unit 40' also has an outwardly-bent portion defining a backstop 86', preferably having the same configuration as backstop 86.

FIG. 8 is generally representative of the condition of vent unit 62 of vent structure 60 following actuation thereof by an overpressure that effects opening of pressure relief portions 74. The vent panels 64 and 66, because of their inherent resilience and memory, return to the vent aperture closing positions thereof, as shown in FIG. 8, as soon as the pressure has been relieved. It is to be observed from FIG. 8 that the margins of pressure release portions 74 defined by lines of weakness 72 of each of the panels 64 and 66, are substantially contiguous with the adjacent internal edges of frame 102 and frame member 110, and the pressure relief portions 74 thus block aperture 32 in structure 34. Immediate closing of the vent aperture 32 by vent panels 64 and 66 has a mitigating effect on secondary explosions and continuation or avoidance of re-ignition of a fast burning fire that could occur if the vent aperture was not promptly blocked.

The alternate vent apparatus 130 having vent structure 160, as shown in FIG. 10, is adapted to be mounted on a conventional frame 134, similar to frame 102, that again is shown only for illustrative purposes. Vent unit 162 of vent structure 160 differs from the vent unit 62 only in that it has a single spring steel panel 164 similar in construction and material dimensions and thickness to spring steel panel 64. Panel 164 is provided with a U-shaped line of weakness defined by a series of spaced, end-to-end slits (not shown) like the slits defining line of weakness 72 in panels 64 and 66. Stainless steel, non-spring steel panels 178 and 180 overlie spring steel panel 164, with a layer of FEP, PTFE, OR PFA 182 interposed between stainless steel panels 178 and 180. The steel panels 178 and 180 also have slits defining lines of weakness complemental with the line of weakness in panel 164. The non-spring steel panels 178 and 180 are preferably of about the same thickness as the spring steel panel 164. A frame element 136, similar to frame member 110, in association with studs 139 and nuts 142 serves to hold vent unit 162 on frame 134.

The frame unit 140, like frame unit 40', has an outwardly-bent portion 184 defining a backstop 186. The alternate backstop 186 of vent apparatus 130 is similar to backstop 86 in that it has an innermost curved section 188 but differs from backstop 86 principally in that the upright section 184 is substantially straight and does not have an outer curved section. If desired, however, backstop 186, in accordance with the preferred embodiment of this invention, may have a second outer curved surface, like section 90 of backstop 86.

It is to be observed from FIG. 10, that upon opening of the vent unit 162, the pressure relief portion 174 of panel 164 returns to its initial position blocking the vent aperture 138 of frame 134, while the pressure relief portions 174 of steel panels 178 and 180 remain in their actuated condition limited by the upright section 184 of backstop 186. The FEP, PTFE, OR PFA sheet 182 also remains trapped between pressure relief portions 168 of panels 178 and 180.

Figure 12:
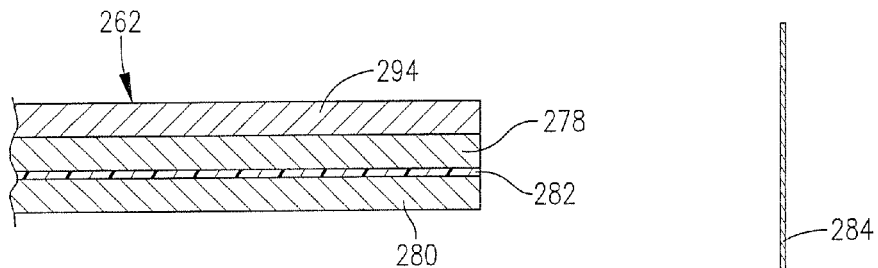
FIG. 12 is an enlarged fragmentary cross-sectional view similar to FIGS. 7 and 9 depicting a portion of other laminar components of an alternate vent unit.
Figure 13:
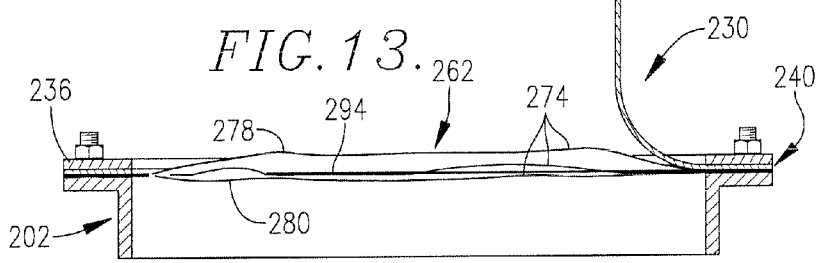
FIG. 13 is a longitudinal cross-sectional view illustrating the positions of the laminar components of the FIG. 12 showing of the vent unit following full opening and reclosing of the movable pressure relief portion of the laminar vent unit.

The vent apparatus 230, as shown in FIGS. 11-13, includes vent structure 260 provided with a vent unit 262, shown as being clamped between a conventional frame 202, similar to frame 102, and a frame element 236. The vent structure 260 has non-spring stainless steel panels 278 and 280, similar to non-spring steel panels 178 and 180 of Fig. The panels 278 and 280 are separated by an FEP, PTFE, OR PFA sheet 282. Viewing FIG. 11, it is to be seen that panel 278 has a U-shaped line of weakness 272 defined by a series of spaced, end-to-end slits 270. The terminal ends of the leg segments 272a and 272b of line of weakness 272 join a bight portion 272c of the line of weakness 272, while the extremities of leg segments 272a and 272b, remote from bight 272c, present a hinge portion 276 of panel 278. It is to be understood that the panel 280 has a series of spaced, end-to-end slits (not shown) defining a line of weakness complemental with line of weakness 272.

A plurality of side-by-side, spaced, parallel, stainless spring steel leaves 294 overlie the outermost face of vent panel 278. The ends of leaves 294 remote from bight 272c of line of weakness 272 in panel 278 are spot-welded, as for example by the spot welds 296, to the upper surface of panel 278. The ends of leaves 294 adjacent hinge area 276 are trapped between a leg of frame 234 and an adjacent leg of frame element 236. A die cut central section 284 of frame element 240 is bent away from the rectangular perimeter of the frame to form an outwardly-directed backstop 286, either of the same configuration as backstop 186 or similar to backstop 86.

FIG. 13 is a cross-sectional illustration of vent apparatus 230 following opening of the pressure relief portions 274 of panels 278 and 280 of vent unit 262 as a result of actuation thereof by a predetermined overpressure. From FIG. 13, it can be observed that the spring steel leaves 294 return panels 278 and 280 to substantially the initial positions thereof, thus effecting immediate closing of the vent aperture of frame 202 upon dissipation of the pressure resulting from a fire or an explosion. The leaves 294 are constructed of spring steel material having memory and resilience parameters similar to those of spring steel panels 64 and 66 previously described. The outer ends of leaves 294 are first caused to bend until the pressure relief portion 274 of panel 278 engages the backstop 286. The pressure relief portion 274 of panel 280 is similarly restrained by backstop 286. As soon as the overpressure condition has been relieved, leaves 294 pressing against panel 278 returns panel 278 to substantially its original position, thereby also returning panel 280 to its initial position, whereby the panels 278 and 280 substantially close vent aperture 238.

Figure 14:
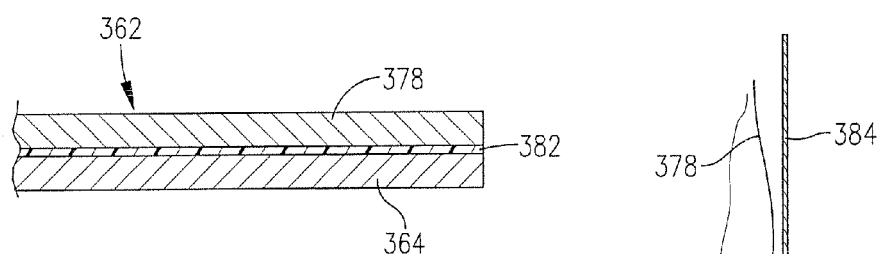
FIG. 14 is an enlarged fragmentary cross-sectional view of a portion of another alternate laminar vent unit.
Figure 15:
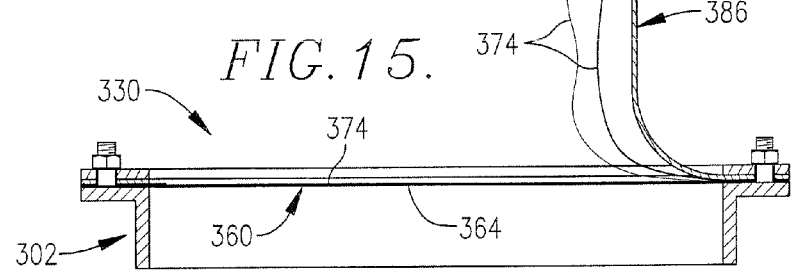
FIG. 15 is a longitudinal cross-sectional view illustrating the positions of the laminar components of the vent unit of FIG. 14 following full opening and reclosing of the spring steel section of the movable pressure relief portion thereof.

Vent apparatus 330 as shown in FIGS. 14, 15 and 21 has vent structure 360 that is mounted on a conventional frame 502 and includes a vent unit 362 that is of identical construction and operation to the vent unit 162, except that a single spring steel panel 364 is provided in association with a stainless non-spring steel panel 378, as illustrated in the fragmentary, schematic, cross-sectional view of FIG. 14. An intermediate stainless non-spring steel panel is omitted between the non-spring steel stainless panel 378 and the stainless spring steel panel 364, as in vent apparatus 230. A sheet of FEP, PTFE, OR PFA 382 is interposed between the stainless steel panel 378 and stainless spring steel panel 364. FIG. 15 shows the actuated positions of the components in that, like the depiction in FIG. 10, the pressure relief portion 374 of spring steel panel 364 has returned to its initial closing position over vent aperture 338, whereas the pressure relief portion 374 of stainless steel panel 378 remains in proximity to the major section 384 of backstop 386. The actuated portion of the FEP, PTFE, OR PFA sheet 382 also may remain adjacent the pressure relief portion 374 of panel 378 as depicted, or it may lay down against the pressure relief portion 374 of spring steel panel 364 that has returned to its initial position.

Figure 16:
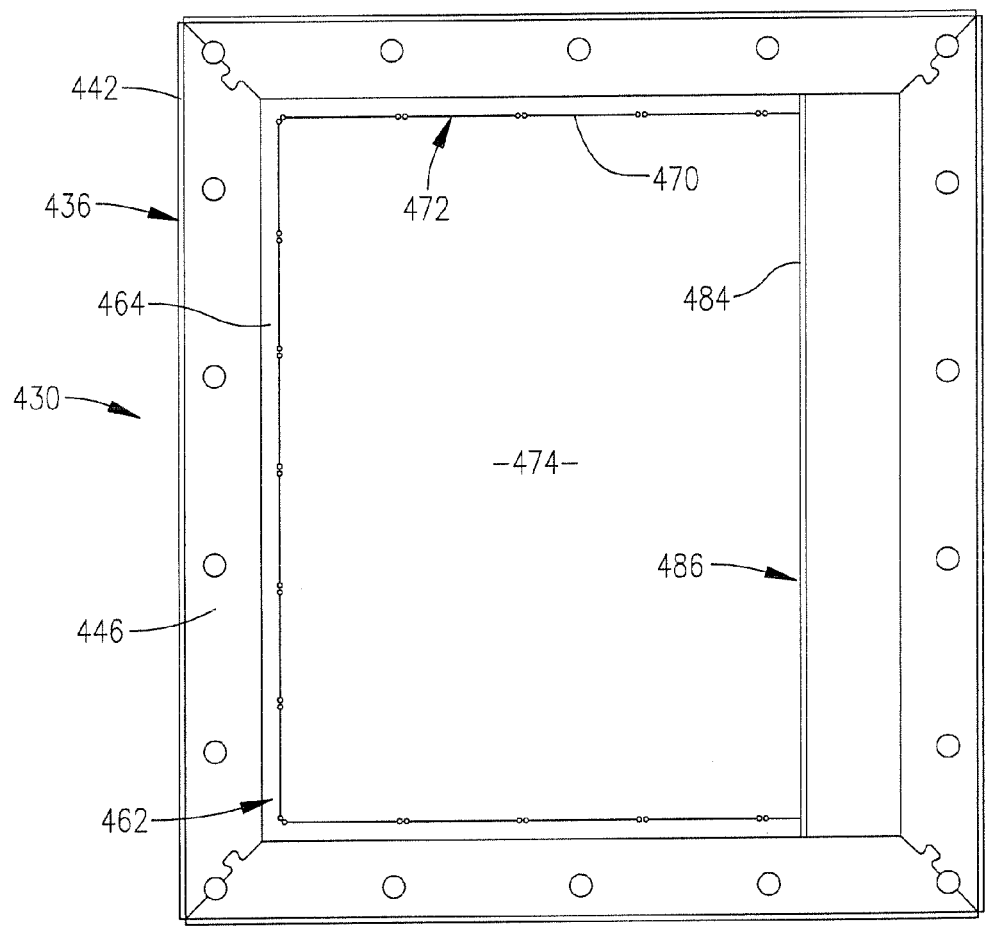
FIG. 16 is a plan view of another alternate form of vent structure having an associated gasket that adapts the vent apparatus to be especially useful for sanitary applications.
Figure 18:
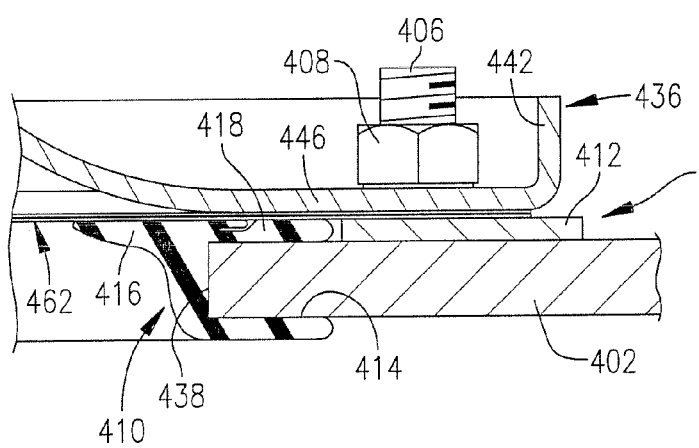
FIG. 18 is an enlarged fragmentary cross-sectional view through a portion of the vent structure depicted in FIG. 16 and illustrating a transversely U-shaped, generally rectangular gasket that may be provided between the vent unit of the vent structure and a support for the gasket.
Figure 17:
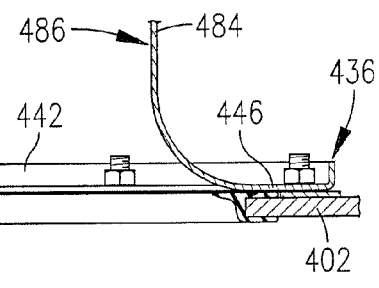
FIG. 17 is a fragmentary longitudinal cross-sectional view on a reduced scale of the vent structure as shown in FIG. 16.

The vent apparatus 430 as depicted in FIGS. 16-18 is particularly adapted for sanitary applications. In this embodiment, the vent unit 462 of vent apparatus 430 may have metal panels as provided in any one of vent units 62, 162, 262, or 362. The top panel 464 of vent unit 462, as shown in plan view in FIG. 16, has a series of spaced slits 470 defining a U-shaped line of weakness 472 and that presents a central pressure relief portion 474. All metal panels making up the vent unit 462 have similar aligned U-shaped lines of weakness.

The differences in vent apparatus 430 as compared with the vent apparatuses previously described reside in the support frame assembly 440 for the vent unit 462, and the provision of an associated elastomeric, rectangular gasket 410 that isolates the vent aperture 438 of frame 402 from the surrounding atmosphere when vent unit 462 is in its closed condition, as shown in FIG. 17. The member 402, having an opening that defines aperture 438, may either be a part of a vessel, a variety of structures, or equipment to be protected from an overpressure condition, or may comprise a rectangular frame, or the like, adapted to be mounted on such vessels, structures, or equipment. In the event member 402 is a separate frame, the vent aperture 438 defined thereby must be of smaller dimensions than the opening in the area requiring protection in order that a portion of the gasket may underlie such frame member 402 to an extent as shown in FIGS. 17 and 18.

The frame assembly 440 for supporting vent unit 462 may include the member 402, if provided as a separate frame, the rectangular frame member 412, and a main rectangular frame element 436. As shown in FIG. 18, frame member 412 rests against either frame member 402, or against the wall of a vessel, structure, or other types of equipment on which the vent apparatus 430 is mounted. Frame element 436 has a peripheral outwardly-directed lip portion 442 that extends around the perimeter of the frame element 436. One margin of vent unit 462 is trapped between frame member 412 and frame element 436. A series of studs 406 are connected to frame member 412 and extend through vent unit 462 and the base portion 446 of frame element 436. Nuts 408 on studs 406 securely affix vent unit 462 to the frame assembly 440.

A die cut central section 484 of frame element 436 is bent away from the rectangular perimeter of frame element 436 to form an outwardly-directed backstop 486 that preferably is of the same configuration as backstop 86, as shown in FIG. 3, and therefore has a curved innermost section and an outer curved section, or is of the configuration of backstop 186.

Gasket 410 is of rectangular overall shape generally corresponding to the length and width dimensions of the vent aperture 438, and has a U-shaped groove 414 that is complemental with and fits over the aperture-defining edge of member 402. The frame member 412 is of a thickness such that a part 418 of gasket 410 trapped between member 402 and an adjacent part of vent unit 462 is compressed, thereby assuring that the interior of the vessel, structure, or equipment requiring protection is isolated from the surrounding atmosphere. Outwardly-directed lip portion 416 of gasket 410 is in contacting sealing engagement with the undersurface of vent unit 462.

The operation of vent unit 462 is identical to the operation of vent units 62 and 162-362 in that the pressure relief portions 474 of the panels open under a predetermined overpressure, and then returns to the initial positions thereof to close aperture 438 upon relief of the overpressure condition.

The vent apparatus 530, as shown in FIGS. 19-21, is also especially useful for sanitary applications. The vent unit 562 of vent structure 560 may be identical to vent unit 62, or vent units 162, 262, or 362. The gasket structure provided is the primary difference between vent structure 560 and vent structure 460. For illustrative purposes, frame 502 which, if desired, may have a rectangular, transversely L-shaped frame element 536, that is similar to frame element 102, shown in FIG. 8. Frame 502 has a flange or leg portion 502a and a leg portion 502b that defines the interior vent aperture 538. A rectangular elastomeric gasket 582 rests on the outermost face of flange 502a. A rectangular frame member 590 is positioned against the face of gasket 582 opposed to flange 502a. It is to be seen from FIG. 20 that the innermost edge 590a of frame member 590 extends inwardly beyond the innermost edge of gasket 582. Another rectangular frame member 592 is positioned against frame member 590. The innermost margin of member 592 is aligned with the inner margin of gasket 582, and therefore does not extend inwardly of gasket 582 and frame member 592, as is the case with frame member 590. The composite vent unit 562 of vent structure 560 rests against the outer face of frame member 592. A rectangular frame element 536 having a base portion 536a and a down-turned, perimeter lip portion 536b rests on the edge of the composite vent unit 562. A rectangular holddown frame member 596 overlies the base portion 536a of frame element 536. Nuts 556 on studs 550 engage the outer surface of frame member 596.

A die cut central section 584 of frame element 536 is also bent away from the rectangular perimeter of frame element 536 to form an outwardly-directed backstop 586 that preferably is of the same configuration as backstop 86, as shown in FIG. 3, or provided with an essentially straight outer section similar to backstop 386 as depicted in FIG. 15.

A rectangular tubular gasket 598, carried by the innermost portion of frame 590 adjacent the edge 590a thereof, is configured and arranged to engage the opposed face of vent unit 562. It can be seen from FIG. 20, that the gaskets 582 and 598 function as seals to isolate the interior of the protected space from the surrounding atmosphere.

Another difference between the vent unit 562 of vent structure 560 and vent units 62, 162, 262, and 362 is the alternate configuration of the lines of weakness in the panels. For example, as shown in FIG. 19, the line of weakness 572 in the uppermost panel 564 and defined by a series of spaced, end-to-end slits 570, has in-turned leg segments 576 opposite the bight section 578 of line of weakness 572. The in-turned leg segments 562 of line of weakness 560 are in spaced relationship and cooperate to define a hinge area 580 for the pressure relief portions 574 of the panels making up vent unit 562.

Operation of the vent apparatus 530 is identical to the vent apparatus previously described in that when an overpressure is applied to the pressure relief portions 574 of vent unit 562, the pressure relief portions open through an arc limited by backstop 586. Upon relief of the high pressure in the protected area, the biased relief portions 574 return to their closed positions by virtue of the provision of a spring steel component or components making up a part of the vent unit 562.

The principal difference between the embodiment of vent apparatus 630, as shown in FIGS. 22 and 23, and the other previously-described embodiments is the provision of a tubular backstop 686 as a replacement for the upright backstops 86, 186-586, inclusive. The tubular backstop 686 has a shell 688 that includes a flat base segment 688a, opposed curved segments 688*b* that are unitary with base segment 688*a*, upper opposed curved segments 688*c* that are unitary with segments 688*b*, and a crown segment 688*d* that is unitary with segments 688*c*. It is to be understood that although the base segment 688*a* is shown as being of one piece, for ease of construction, the segment 688*a* may be two separate portions that abut one another at the center of the base segment 688*a*.

In an exemplary embodiment of backstop 686, the shell 688 of backstop 686 may be of stainless steel material having a wall thickness of about 2 mm, with the overall width of the tubular shell being about 130 mm. The OD radius of curvature of segments 688*b* about imaginary points A-1 and A-2 is about 50 mm. The OD radius of curvature of segments 688*c* about imaginary points B-1 and B-2 is about 105 mm. The OD radius of curvature of segments 688*d* about imaginary point C is about 70 mm.

Backstop 686 is secured to the flange 602*a* of representative frame 602 by connectors comprising studs 650 projecting from flange 602*a* through an edge portion of vent unit 662 and a plate 654 resting against base segment 688*a*. Nuts 656 secure the plate 654 and backstop 686 to the frame 636. The crown segment 688*d* of backstop 686 has a series of openings 688*e* that are aligned with respective studs 650 to provide ready access for application and removal of nuts 656 for securing and removing the backstop 686.

The vent units 662 may be constructed similar to any one of vent units 62, 162, 262, or 362. Opening and reclosing of vent unit 662 is the same as the operation of the other vent units. An advantage of the tubular backstop 686 is that it provides a continuously curved surface for limiting the opening movement of pressure relief portions 668 of the vent units 662 and serves to more uniformly distribute the bending forces applied to the hinge areas of the pressure relief portions of the vent structures as those relief portions open and then return to their initial positions. Elastic deformation of the spring steel vent membrane is greater with tubular backstop 686 than the upright backstops as, for example, shown in FIGS. 10, 13, 15, and 21, thus increasing limitation and absorption of the kinetic energy of movement of the pressure relief portions of the vent structure. Other advantages of the tubular backstop 686 is that one size may be used for more than one vent unit, and the tubular backstop occupies less available space than an upright backstop.

The vent structures of this invention are especially useful in relatively large sizes, for example from about 200 mm by 200 mm to about 1500 mm by 2000 mm. The various embodiments described and illustrated herein may fabricated to open at different overpressures. For example, changing the type and thickness of the materials selected for fabrication of the components of the composite laminated vent units 62, provision of scoring versus slitting of the metal panels, and varying the length of the slits 70, the length of individual slits defining a line of weakness 72, and/or the unslitted distance between adjacent slits can alter the overpressure required to effect opening of the pressure relief portion 74 of laminated composite units 62.

Stop motion studies of operation of physical embodiments of the present invention have demonstrated that even though the pressure relief portion of a vent unit during opening under a predetermined overpressure condition, such as generated by an explosion, may undergo significant distortion and even assume a moving wavelike appearance as a result of the high pressure front thereagainst, upon relief of the pressure condition, unexpectedly returns to substantially its original planar undistorted configuration in generally closing relationship to the vent aperture.

The generally circular vent apparatus 700, as shown in FIGS. 24-26, includes a transversely L-shaped annular coupling member 702 adapted to be mounted on the structure of an area to be protected from an explosion or untoward overpressure event. Coupling member 702 has an annular flange or leg portion 702*b* unitary with an outwardly-directed, circumferentially-extending, generally flat flange portion 702*a*. The leg portion 702*b* of vent apparatus 700 is adapted to be affixed to the structure requiring protection from an overpressure condition, in alignment with a circular vent aperture in the structure.

The frame member 704 of circular vent apparatus 700 includes a generally planar, annular frame element 706 provided with a series of spaced apertures 708 for receiving fasteners such as bolts for securing frame element 706 to the flange portion 702*a* of coupling member 702. A backstop 710 that is unitary with annular frame element 706, extends away from the plane of element 706 at an angle of approximately 90° with respect to element 706. Backstop 710 is of similar construction to backstop 86 in that it has a central section 712 of generally planar configuration unitary with opposed curved sections 714 and 716, respectively. A pair of braces 718 may be provided, if desired, between frame element 706 and the normally rear face of curved section 714 of backstop 710. The principal difference between backstop 710 and backstop 86, for example, is that backstop 710 is of generally circular overall configuration, whereas backstop 86 is substantially rectangular in shape, as best illustrated in FIG. 1.

A circular vent unit 720 is interposed between the annular frame element 706 and flange portion 702*a* of coupling member 702. Vent unit 720 preferably includes a stainless spring steel panel 722 having a series of end-to-end slits 724 defining a generally C-shaped line of weakness 726 presenting a central relief portion 727. The opposed terminal end portions 726*a* and 726*b* of line of weakness 726 are spaced from one another, presenting therebetween a unitary hinge area 728 of panel 722. A series of openings 730 in the perimeter of panel 722 are located to align with respective apertures 708 in frame element 706

Circular vent unit 720 has a second spring steel panel 732 of the same diameter, configuration and construction as panel 722. Accordingly, panel 732 has a circular line of weakness 734 defined by a series of end-to-end slits 736 presenting a central relief portion 735. The spaced terminal ends 734*a* and 734*b* of line of weakness 734 define a unitary hinge area 738 of panel 732. The hinge areas 728 and 738 are of the same length between opposed ends of lines of weakness 726 and 734 and are aligned with one another.

A relatively thin circular cover sheet 740, preferably of FEP, or alternatively PTFE, or PFA, is interposed between panels 722 and 732. A substantially C-shaped, relatively thin strip 742 of FEP, PTFE, or PFA is preferably interposed between cover sheet 740 and the adjacent face of panel 722. Strip 742 is configured and strategically located to be aligned with and cover the slits 724 of line of weakness 726. The opposed ends 742*a* and 742*b* of strip 742 are spaced a distance approximately equal to the width of hinge area 728 and are aligned with the latter. A second substantially C-shaped, relatively thin strip 744 of FEP, PTFE, or PFA is interposed between cover sheet 740 and the adjacent face of panel 732. Strip 744 is configured to cover the slits 734 of line of weakness 736. The opposed ends 744*a* and 744*b* of strip 744 are aligned with hinge area 738 and spaced a distance approximately equal to the width of hinge area 738.

The materials of construction of the circular vent apparatus 700 are preferably the same as materials of construction of vent apparatus 30. Accordingly, the spring steel panels are of the same thickness and fabricated from the same type of metals as the spring steel panels of apparatus 30. Similarly, the FEP, PTFE, or PFA strips and cover sheet of circular vent apparatus 700 is preferably of the same thickness and material as the FEP, PTFE, or PFA and equivalent components as described with respect to apparatus 30.

Although the preferred embodiment of vent apparatus 700 is provided with two spring steel panels, such as panels 722 and 732, with intervening polyfluorinated layers of material therebetween as described, it is to be understood that the vent unit 720 may be of laminated construction as described with respect to any one of the embodiments as illustrated in FIGS. 4, 5, 7, 9, 12, and 14, and that are described in detail hereinabove.

Vent apparatus 700 also operates in a manner similar to vent apparatus 30 to relieve a high overpressure condition. When an overpressure arises within an area protected by circular vent apparatus 700 that is sufficient to disrupt the tab portions of panels 722 and 732 between adjacent slits 724 and 736 respectively, the pressure relief portions 727 and 735 of panels 722 and 732 respectively, open immediately to relief the high overpressure in the protected area. It is to be observed from FIG. 25 that the line of weakness 726 in panel 722 is closely adjacent the internal arcuate margin of frame member 704. Because the lines of weakness 726 in panel 722 and 734 in panel 732 are aligned, substantially full venting through the vent unit 720 is obtained for maximum pressure relief. The backstop 710, which is engaged by the adjacent relief portion 727 of panel 722 serves to prevent overstressing of hinge areas 728 and 738 of panels 722 and 732 to an extent that the yield point and tensile strength of the spring steel material is exceeded. Accordingly, upon relief of the high overpressure condition in the protected area, the panels 722 and 732 return to their initial positions substantially closing the vent aperture in the protected are structure, in a manner similar to that described with respect to reclosing of the pressure relief areas of rectangular vent apparatus 30.

We claim:

1. Vent apparatus for protecting a confined space having a vent aperture for relief of an overpressure condition, said vent apparatus comprising:

vent structure including a vent unit adapted to be positioned over the vent aperture in normal closing relationship thereto said structure being provided with a movable pressure relief portion having an initial closed position across the vent aperture and movable to an open position extending away from the vent aperture when a predetermined overpressure in the confined space is applied against the relief portion of the vent unit through the vent aperture, said relief portion being defined by a line of weakness in the vent unit; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

2. The vent apparatus of claim 1, wherein said vent unit has a spring steel panel, said relief portion being at least a part of the panel.

3. The vent apparatus of claim 2, wherein said panel is of stainless steel spring steel.

4. The vent apparatus of claim 2, wherein the difference between the yield point and tensile strength of the panel is no more than about 30%.

5. The vent apparatus of claim 2, wherein the yield point and tensile strength of the panel are at least about 1200 N/mm$^2$ and about 1450 N/mm$^2$, respectively.

6. The vent apparatus of claim 1, wherein said line of weakness is defined by a series of spaced, end-to-end slits in the vent unit.

7. The vent apparatus of claim 6, wherein is provided a sheet of synthetic resin material positioned against the vent unit in closing relationship to said slits in the vent unit.

8. The vent apparatus of claim 7, where said synthetic resin material is fluorinated ethylene propylene.

9. The vent apparatus of claim 1, wherein said line of weakness is of generally U-shaped configuration having a pair of opposed leg segments and a bight segment therebetween, the end extremities of the leg segments remote from said bight segment defining a hinge area for the relief portion of the vent unit.

10. The vent apparatus of claim 1, wherein said vent structure is of generally circular configuration, and the line of weakness is C-shaped presenting a hinge area between the opposed ends of said C-shaped line of weakness.

11. The vent apparatus of claim 1, wherein said backstop has an outwardly directed, generally planar section, and a transversely curved section adjacent the vent unit, and wherein said length of the backstop is at least about as great as the length of the panel that opens when a predetermined overpressure is applied against the relief portion of the panel.

12. The vent apparatus of claim 1, wherein said backstop has an outwardly directed, generally planar section, and a transversely curved section adjacent the vent unit, and wherein said vent structure and the vent unit thereof are of generally circular configuration, said vent unit having a generally circular pressure relief portion, the backstop being of generally circular shape substantially conforming to the configuration of the pressure relief portion of the vent unit.

13. The vent apparatus of claim 1, wherein said backstop has an outwardly directed, generally planar section, and a transversely curved section adjacent the vent unit, and wherein said vent structure includes a frame member adapted to be positioned in alignment with the vent aperture, said transversely curved section of the backstop being unitary with the frame member.

14. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture, said vent unit including a plurality of superimposed components, one of said components being a spring steel panel provided with a line of weakness defining said pressure relief portion of the vent unit, another of said components being a metal sheet having a line of weakness at least generally aligned with the line of weakness in the panel, the difference between the yield point and tensile strength of the metal sheet being substantially greater than the difference between the yield point and tensile strength of the spring steel panel; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

15. The vent apparatus of claim 14, wherein said panel and the sheet are provided with a series of spaced, end-to-end slits defining respective lines of weakness, and said vent unit includes a sheet of synthetic resin material overlying and closing said slits in the panel and the sheet.

16. The vent apparatus of claim 14, wherein is provided a pair of said metal sheets having lines of weakness therein and located on opposite sides of the spring steel panel.

17. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent, said vent unit including a plurality of superimposed metal components, two of said components each being a spring steel panel provided with aligned lines of weakness defined by a series of spaced, end-to-end slits in respective panels, said slits in the components cooperatively defining said pressure relief portion of the vent unit, and at least one sheet of synthetic resin material interposed between said panels in closing relationship to the slits in opposed components; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

18. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition, said backstop having an outwardly directed, generally planar section, and a transversely curved section adjacent the vent unit, less than the length of the planar section of the backstop in a direction away from the panel. wherein the transverse width of the curved section of the backstop is substantially 19. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture, said vent unit including a plurality of superimposed components, one of said components being a spring steel panel, at least two other components being metal sheets, said panel and sheets being provided with a series of spaced, end-to-end slits defining aligned lines of weakness in the panel and metal sheets respectively, said slits cooperatively defining said pressure relief portion of the vent unit, the difference between the yield point and tensile strength of the metal sheets being substantially greater than the difference between the yield point and tensile strength of the spring steel panel, and a sheet of synthetic resin material positioned against the panel and said metal sheets in closing relationship to said slits in the panel and said metal sheets; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

20. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture, said vent unit including at least a pair of juxtaposed spring steel panels, each of said panels having a series of spaced, end-to-end slits defining a line of weakness, the lines of weakness in the panels being aligned to define said pressure relief portion of the vent unit, and a pair of synthetic resin sheets being located between the spring steel panels in covering relationship to respective lines of weakness; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

21. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture, said vent unit including at least a pair of juxtaposed spring steel metal sheets, and a stainless steel panel against one of the metal sheets, said spring steel metal sheets and said stainless steel panel having a series of spaced, end-to-end slits defining respective lines of weakness, said lines of weakness in the spring steel metal sheets and stainless steel panel being aligned to define the movable pressure relief portion of the vent unit, and a synthetic resin sheet positioned in disposition closing the slits in said spring steel metal sheets and said stainless steel panel, the difference between the yield point and tensile strength of each of the spring steel metal sheets being substantially greater than the difference between the yield point and the tensile strength of the stainless steel panel; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition.

22. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said backstop being of tubular configuration having a curved segment presenting a curvilinear outer surface positioned to limit movement of the relief portion of the vent unit to said selected open position, said relief portion of the vent apparatus having a sufficient modulus of resilience and elasticity to cause the relief portion to return from its open position to its initial position upon relief of the overpressure condition.

23. The vent apparatus of claim 22, wherein said curved segment of the tubular backstop has a curvilinear outer surface portion of greater curvature adjacent the relief portion of the stainless steel panel than an adjacent curvilinear outer surface portion of the tubular backstop.

24. The vent apparatus of claim 22, wherein said tubular backstop is of generally oval shape transversely thereof.

25. The vent apparatus of claim 22, wherein said tubular backstop has openings therein providing access to connectors for affixing the backstop in predetermined disposition with respect to the pressure relief portion of the spring steel panel.

26. Vent apparatus for protecting a confined space having a vent aperture for relief of an overpressure condition, said vent apparatus comprising:

a frame assembly; and vent structure mounted on the frame assembly and adapted to be positioned over the vent aperture in normal closing relationship thereto, said structure including a vent unit provided with a movable pressure relief portion having an initial position extending across the vent aperture, said relief portion being defined by a line of weakness in the vent unit, said frame assembly including a backstop unit disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said backstop unit further including a transversely curved section that merges into and becomes a part of the frame assembly, said relief portion of the vent apparatus having a sufficient modulus of resilience and elasticity to cause the relief portion to return to its initial position from its open position upon relief of the overpressure condition in said confined space.

27. The vent apparatus of claim 26, wherein said frame assembly, the vent structure mounted thereon, the vent unit, and the backstop unit are all of generally rectangular configuration.

28. The vent apparatus of claim 26, wherein said frame assembly, the vent structure mounted thereon, the vent unit, and the backstop unit are all of generally circular configuration.

29. The vent apparatus of claim 26, wherein is provided a generally flexible gasket configured to seal the perimeter of the vent unit when the latter is in normal closing relationship to the vent aperture.

30. Vent apparatus for protecting a confined space having a vent aperture for relief of an overpressure condition, said vent apparatus comprising:

a frame assembly;

vent structure mounted on the frame assembly and adapted to be positioned over the vent aperture in normal closing relationship thereto, said structure including a vent unit provided with a movable pressure relief portion having an initial position extending across the vent aperture, said frame assembly including a backstop unit disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said backstop unit further including a transversely curved section that merges into and becomes a part of the frame assembly, said relief portion of the vent apparatus having a sufficient modulus of resilience and elasticity to cause the relief portion to return to its initial position from its open position upon relief of the overpressure condition in said confined space; and a generally flexible gasket configured to seal the perimeter of the vent unit when the latter is in normal closing relationship to the vent aperture, said gasket being of transversely U-shaped configuration, and having a groove for receiving a support member associated with the frame assembly.

31. Vent apparatus for protecting a confined space having a vent aperture for relief of an overpressure condition, said vent apparatus comprising:

vent structure adapted to be positioned over the vent aperture in normal closing relationship thereto, said structure including a vent unit having a metal sheet provided with a movable pressure relief portion having an initial position extending across the vent aperture, said relief portion being defined by a line of weakness in the metal sheet;

a backstop for arresting movement of the relief portion of the metal sheet to a selected open position extending away from the vent aperture when a predetermined overpressure in the confined space is applied against the relief portion through the vent aperture; and a series of spring steel leaves engaging the metal sheet, said leaves undergoing bending during opening of the relief portion of the metal sheet, each of said spring steel leaves having a sufficient modulus of resilience and elasticity to exert sufficient force on the relief portion of the metal sheet to cause the relief portion to return to its initial position from its open position upon relief of the overpressure condition in said confined space.

32. The vent apparatus of claim 31, wherein said line of weakness is defined by a series of spaced, end-to-end slits in the metal sheet.

33. The vent apparatus of claim 32, wherein a sheet of synthetic resin material is positioned against the metal sheet in closing relationship to said slits in the metal sheet.

* * * * *

UNITED STATES PATENT AND TRADEMARK OFFICE
CERTIFICATE OF CORRECTION

PATENT NO. : 7,628,167 B2  
APPLICATION NO. : 11/466958  
DATED : December 8, 2009  
INVENTOR(S) : Tom Eijkelenberg et al.

Page 1 of 1

It is certified that error appears in the above-identified patent and that said Letters Patent is hereby corrected as shown below:

Col. 19-20 claim 18 should read as follows:

18. Vent apparatus for protecting a confined space having a vent aperture for relief of an overpressure condition, said vent apparatus comprising:

vent structure including a vent unit adapted to be positioned over the vent aperture in normal closing relationship thereto, said structure being provided with a movable pressure relief portion having an initial closed position across the vent aperture and movable to an open position extending away from the vent aperture when a predetermined overpressure in the confined space is applied against the relief portion of the vent unit through the vent aperture; and a backstop disposed in a selected position to be engaged by and to arrest movement of the pressure relief portion of the vent unit during opening thereof to an extent that the modulus of elasticity of the movable pressure relief portion is not exceeded, said backstop being operable to absorb and dissipate kinetic energy in the movable pressure relief portion as it engages the backstop, said relief portion of the vent apparatus having a sufficient modulus of resilience and elasticity to cause the relief portion to return from its open position to its initial position upon relief of the overpressure condition, said backstop having an outwardly directed, generally planar section, and a transversely curved section adjacent the vent unit, <u>wherein the transverse width of the curved section of the backstop is substantially</u> less than the length of the planar section of the backstop in a direction away from the panel. ~~wherein the transverse width of the curved section of the backstop is substantially~~

Signed and Sealed this  
Third Day of July, 2012

David J. Kappos  
*Director of the United States Patent and Trademark Office*